United States Patent
Hu et al.

(10) Patent No.: US 11,606,784 B2
(45) Date of Patent: Mar. 14, 2023

(54) BEAM REFINEMENT FOR IN-ACTIVE STATE DATA TRANSMISSION

(71) Applicant: Samsung Electronics Co., Ltd., Suwon-si (KR)

(72) Inventors: Liang Hu, San Diego, CA (US); Jung Hyun Bae, San Diego, CA (US); Mohammed Karmoose, San Diego, CA (US)

(73) Assignee: SAMSUNG ELECTRONICS CO., LTD.

( * ) Notice: Subject to any disclaimer, the term of this patent is extended or adjusted under 35 U.S.C. 154(b) by 112 days.

(21) Appl. No.: 17/324,095

(22) Filed: May 18, 2021

(65) Prior Publication Data

US 2021/0392626 A1    Dec. 16, 2021

Related U.S. Application Data

(60) Provisional application No. 63/038,733, filed on Jun. 12, 2020.

(51) Int. Cl.
*H04W 72/04*    (2009.01)
*H04W 24/10*    (2009.01)
*H04L 5/00*     (2006.01)

(52) U.S. Cl.
CPC ......... *H04W 72/042* (2013.01); *H04L 5/0048* (2013.01); *H04W 24/10* (2013.01)

(58) Field of Classification Search
CPC .... H04W 72/042; H04W 24/10; H04L 5/0048
See application file for complete search history.

(56) References Cited

U.S. PATENT DOCUMENTS

| | | | |
|---|---|---|---|
| 2011/0194477 A1* | 8/2011 | Damnjanovic | H04W 4/06 |
| 2021/0235386 A1* | 7/2021 | Zhang | H04L 5/0023 |
| 2021/0266975 A1* | 8/2021 | Taherzadeh | H04B 7/0695 |

* cited by examiner

*Primary Examiner* — Ronald B Abelson
(74) *Attorney, Agent, or Firm* — Renaissance IP Law Group LLP

(57) ABSTRACT

A system and a method are disclosed for beam refinement to enable inactive mode transmission in frequency range 2 for 3GPP RedCap devices. A RedCap device receives system information in a SIB1 from a wireless network in which the SIB1 includes information relating to an indication of resources used to transmit a SIB-x. The device receives the SIB-x, which includes an indication of at least one resource, at least one configuration for a Downlink-Reference Signal (DL-RS) transmission, and information relating to a measurement report relating to the beam-refinement measurement that is to be performed by a device. The device receives the DL-RS transmission from the wireless communication network, performs the beam-refinement measurement, and sends a measurement report to the wireless network. Subsequent to sending the measurement report, the device sends an enhanced transmission to the wireless network based on the measurement report.

25 Claims, 15 Drawing Sheets

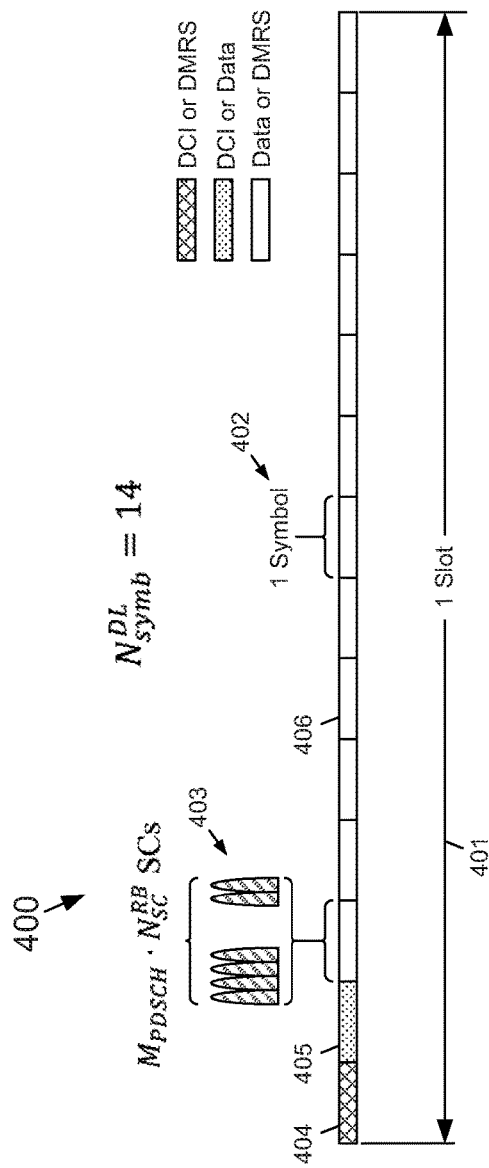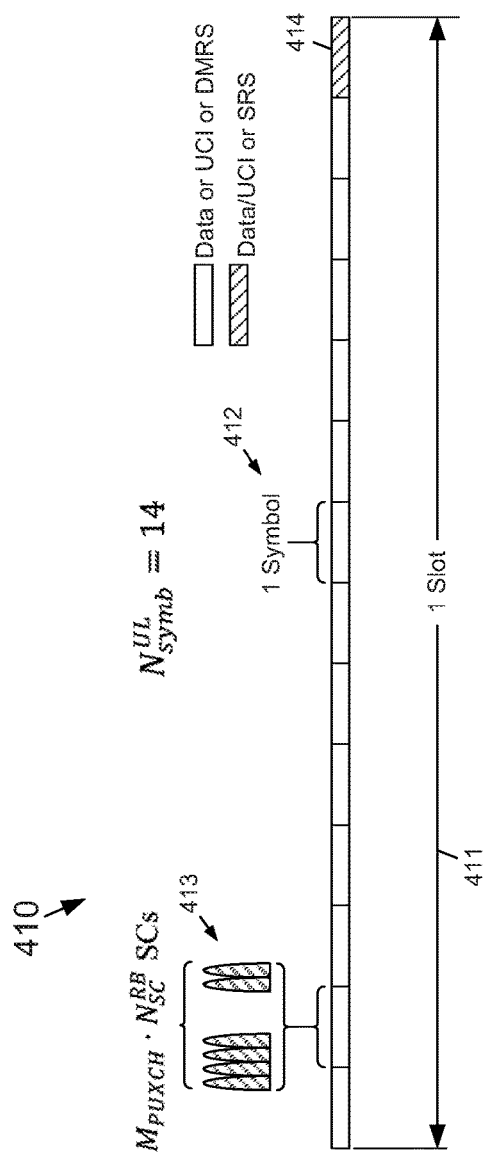

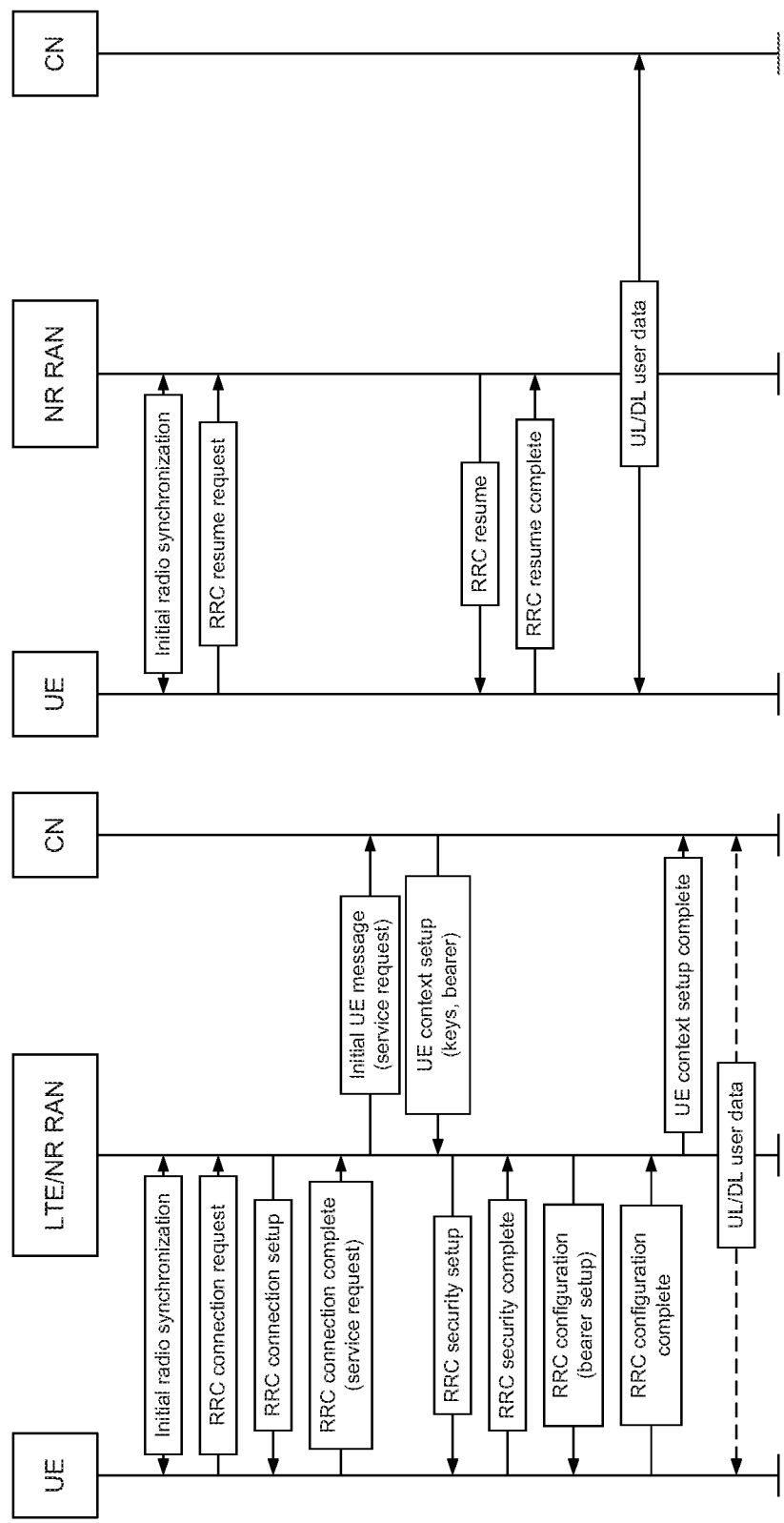

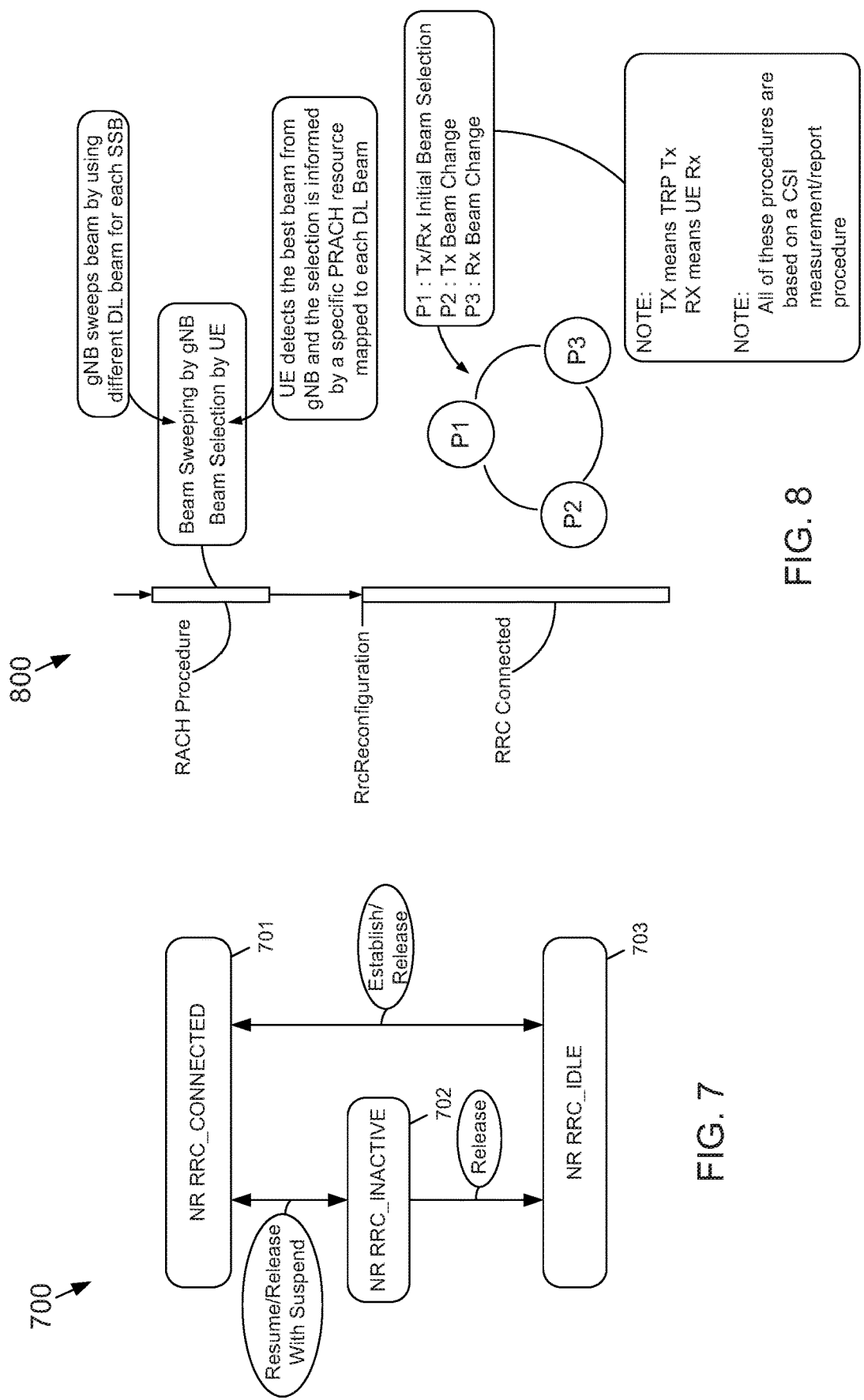

BEAM REFINEMENT FOR IN-ACTIVE STATE DATA TRANSMISSION

CROSS-REFERENCE TO RELATED APPLICATION

This application claims the priority benefit under 35 U.S.C. § 119(e) of U.S. Provisional Application No. 63/038,733, filed on Jun. 12, 2020, the disclosure of which is incorporated herein by reference in its entirety.

TECHNICAL FIELD

The subject matter disclosed herein generally relates to wireless communication systems. More specifically, the subject matter disclosed herein relates to beam refinement in user equipment that is in an inactive state for the Fifth Generation (5G) technology standard for cellular networks.

BACKGROUND

In a cellular system, a New Radio (NR) user equipment (UE) may in a NR RRC_CONNECTED state, a NR RRC_INACTIVE state or a NR RRC_IDLE state. A UE may only be in only one RRC state in NR at any given time. An objective in the $3^{rd}$ Generation Partnership Project (3GPP) Release 17 (Rel-17) Study Item Description (SID) on Reduced Capability (RedCap) New Radio (NR) device is to support the same set of use cases in Frequency Range 2 (FR2) as in case of Frequency Range 1 (FR1). Beam refinement may be a key feature for FR2 operation in NR. An important issue may relate to enabling a beam refinement procedure for RedCap UEs that are in a RRC_INACTIVE state.

SUMMARY

An example embodiment provides a device that may include a transceiver and a processing device. The transceiver may be coupled to a wireless communication network. The processing device may be coupled to the transceiver, and while the device is in an inactive state, the processing device may be configured to control the transceiver to: receive system information in a System Information Block 1 (SIB1) from the wireless communication network in which the SIB1 may include information relating to an indication of resources used to transmit a SIB-x by the wireless communication network, receive the SIB-x from the wireless communication network in which the SIB-x may include an indication of at least one resource, at least one configuration for a Downlink-Reference Signal (DL-RS) transmission by the wireless communication network, and information relating to a measurement report relating to a beam-refinement measurement that is to be performed by the device, and receive the DL-RS transmission from the wireless communication network. In one embodiment, the device may be a reduced-capability (RedCap) user equipment, and the wireless communication network may be a 5G wireless communication network. In one embodiment, the SIB-x may be periodically sent by the wireless communication network. In another embodiment, the device may be in the inactive state, and the processing device may be further configured to control the transceiver to: send an on-demand SIB-X request to the wireless communication network, and receive the SIB-x sent by the wireless communication network in response to the on-demand SIB-x request. In still another embodiment, the DL-RS transmission may be periodically sent by the wireless communication network. In yet another embodiment, the DL-RS transmission may be sent by the wireless communication network in response to an on-demand DL-RS request sent by the device to the wireless communication network. In one embodiment, while the device is in the inactive state, the processing device may be further configured to control the transceiver to: perform the beam-refinement measurement, and send the measurement report to the wireless communication network. Additionally, while the device is in the inactive state, the processing device may be further configured to control the transceiver to send an enhanced transmission to the wireless communication network based on the measurement report.

An example embodiment provides a base station in a wireless communication network in which the base station may include a first transceiver and a first processing device. The first processing device may be coupled to the first transceiver, and the first processing device may be configured to: send system information in a SIB1 to a device wirelessly coupled to the wireless communication network in which the SIB1 may include information relating to an indication of resources used to transmit a SIB-x by the wireless communication network in which the device may be in an inactive state, send the SIB-x to the device in which the SIB-x may include an indication of at least one resource, at least one configuration for a DL-RS transmission by the wireless communication network, and information relating to a measurement report relating to a beam-refinement measurement that is to be performed by the device, and send the DL-RS transmission to the device. In one embodiment, the device may be a RedCap user equipment, and the wireless communication network may be a 5G wireless communication network. In one embodiment, the SIB-x may be periodically sent by the base station. In another embodiment, the first processing device may further control the first transceiver to send the SIB-x to the device in response to an on-demand SIB-x request received from the device. In still another embodiment, the DL-RS transmission may be periodically sent by the base station. In yet another embodiment, the first processing device may further control the first transceiver to send the DL-RS transmission to the device in response to an on-demand DL-RS request received from the device. The device may include a second transceiver and a second processing device. The second transceiver may be coupled to the wireless communication network. The second processing device may be coupled to the second transceiver in which the second processing device may be configured to: receive the system information in the SIB1, receive the SIB-x, receive the DL-RS transmission, perform the beam-refinement measurement, and send the measurement report to the wireless communication network. The first processing device may further control the first transceiver to receive a measurement report from the device. Additionally, the first processing device may further control the first transceiver to receive an enhanced transmission from the device based on the measurement report.

An example embodiment provides a method to perform a beam-refinement measurement in a wireless communication network in which the method may include: receiving, by a device, system information in a SIB1 from the wireless communication network in which the SIB1 may include information relating to an indication of resources used to transmit a SIB-x by the wireless communication network, the device being in an inactive state; receiving, by the device, the SIB-x from the wireless communication network in which the SIB-x may include an indication of at least one resource, at least one configuration for a DL-RS transmission by the wireless communication network, and information relating to a measurement report relating to the beam-refinement measurement that is to be performed by the device; and receiving, by the device, the DL-RS transmission from the wireless communication network. In one embodiment, the device may be a RedCap user equipment, and the wireless communication network may be a 5G wireless communication network. In one embodiment, the SIB-x may be periodically sent by the wireless communication network. In another embodiment, the SIB-x may be sent by the wireless communication network in response to an on-demand SIB-x request sent by the device to the wireless communication network. In one embodiment, the DL-RS transmission may be periodically sent by the wireless communication network. In still another embodiment, the DL-RS transmission may be sent by the wireless communication network in response to an on-demand DL-RS request sent by the device to the wireless communication network. In another embodiment, the method may further include: performing, by the device, the beam-refinement measurement; and sending, by the device to the wireless communication network, the measurement report. In yet another embodiment, the method may further include sending by the device an enhanced transmission to the wireless communication network based on the measurement report.

BRIEF DESCRIPTION OF THE DRAWING

In the following section, the aspects of the subject matter disclosed herein will be described with reference to exemplary embodiments illustrated in the figures, in which:

FIG. 4A depicts an example embodiment of a downlink slot structure according to the subject matter disclosed herein;

FIG. 4B depicts an example embodiment of an uplink slot structure 410 for physical uplink shared channel transmission or physical uplink control channel transmission according to the subject matter disclosed herein;

FIGS. 6A and 6B respectively show a comparison of signaling involved in a legacy idle-to-connected transition and an inactive-to-connected transition according to the subject matter disclosed herein;

FIG. 7 shows an overview of a UE RRC state machine and state transitions in NR;

FIG. 8 shows an overview of beam management in a RRC_Connected state;

DETAILED DESCRIPTION

Figure 1:
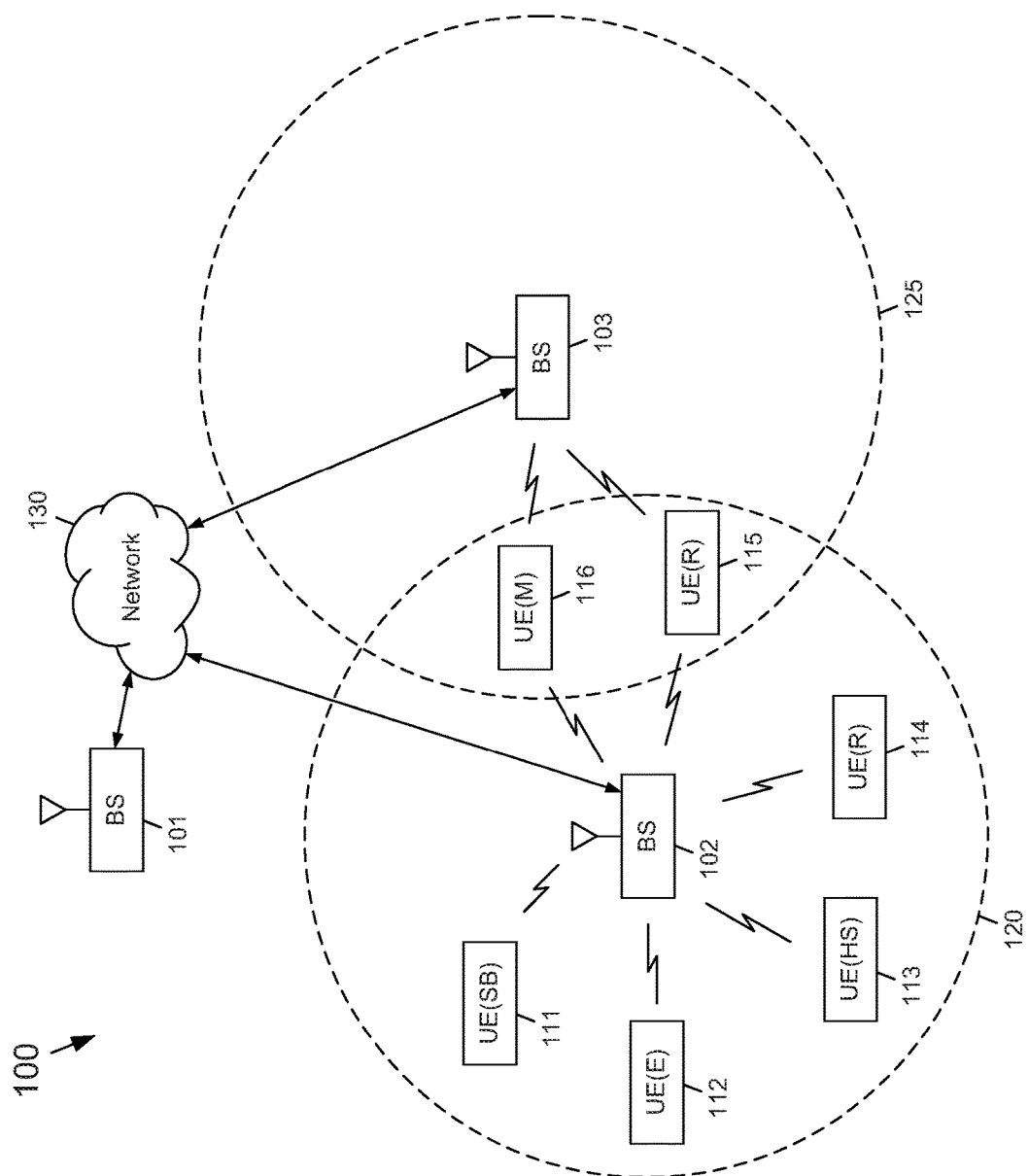
FIG. 1 depicts an example embodiment of a wireless communication network according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.).

Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

FIGS. 1-16, described below, and the various embodiments used to illustrate the subject matter disclosed herein are only by way of example and should not be construed in any way to limit the scope of the subject matter disclosed herein. It should be understood that the subject matter disclosed herein may be implemented in any suitably arranged system or device.

At least the following documents are hereby incorporated by reference into the present disclosure as if fully set forth herein: 3GPP TS 38.211 v15.6.0, "NR; Physical channels and modulation;" 3GPP TS 38.212 v15.6.0, "NR; Multiplexing and Channel coding;" 3GPP TS 38.213 v15.6.0, "NR; Physical Layer Procedures for Control;" 3GPP TS 38.214 v15.6.0, "NR; Physical Layer Procedures for Data;" 3GPP TS 38.321 v15.6.0, "NR; Medium Access Control (MAC) protocol specification;" and 3GPP TS 38.331 v15.6.0, "NR; Radio Resource Control (RRC) Protocol Specification."

Figure 2:
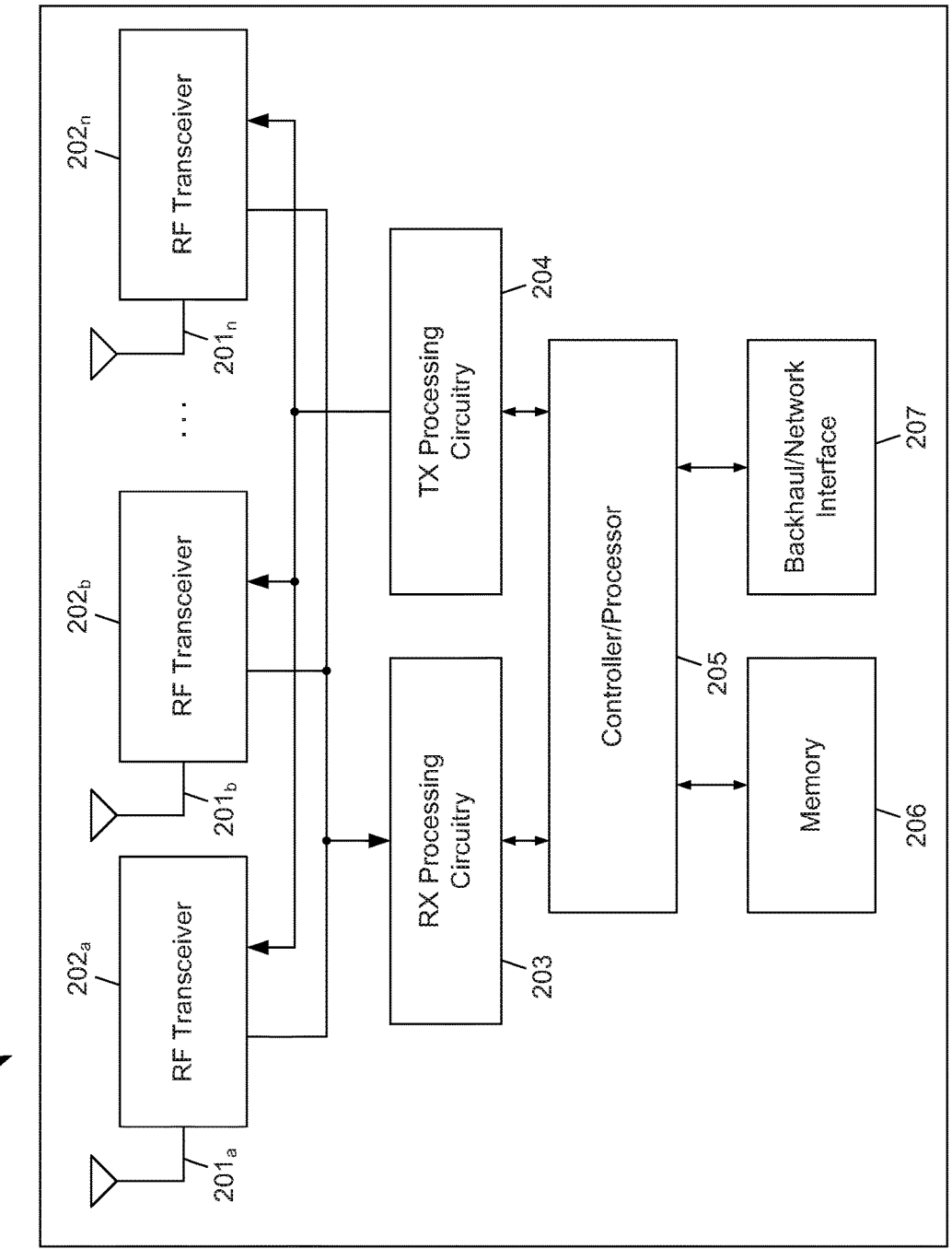
FIG. 2 depicts an example embodiment of a base station according to the subject matter disclosed herein.
Figure 3:
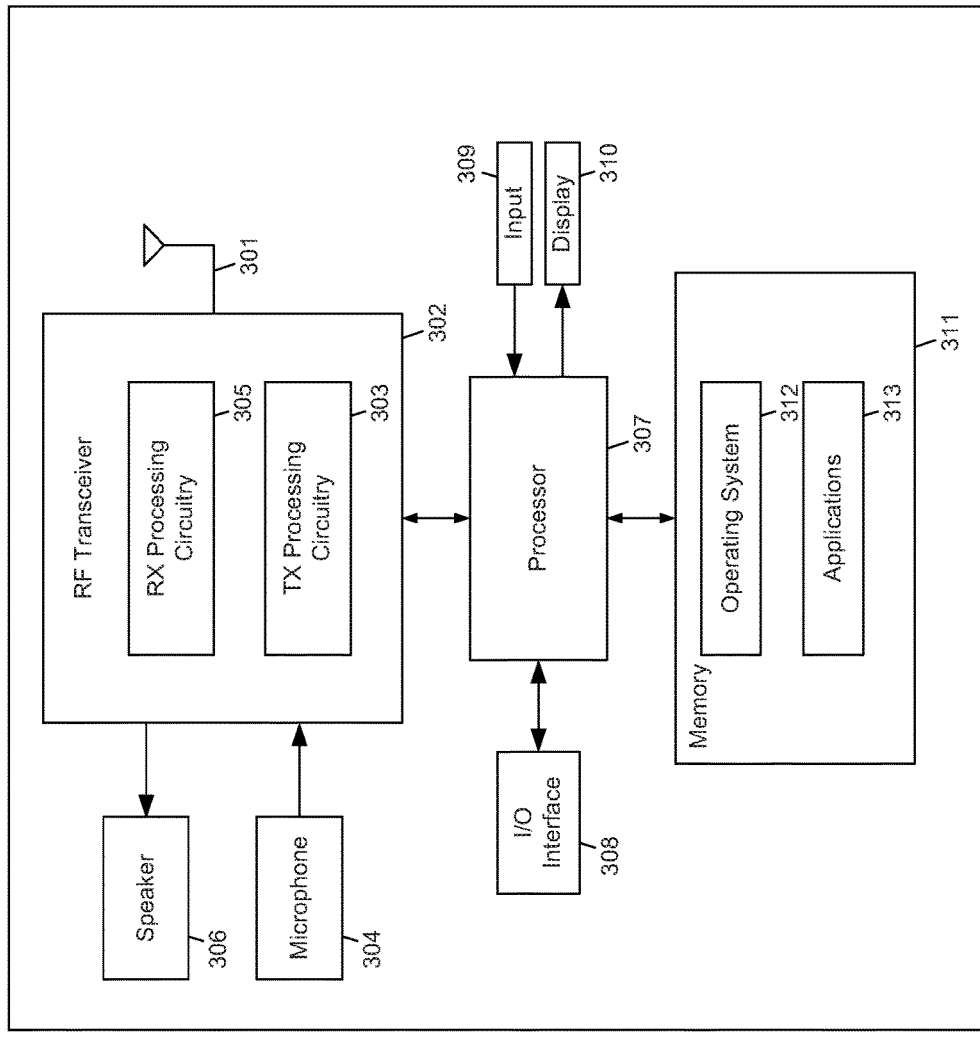
FIG. 3 depicts an example embodiment of UE according to the subject matter disclosed herein.

FIGS. 1-5 depict various example embodiments implemented in wireless communications systems and use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the subject matter disclosed herein may be implemented in any suitably-arranged communications system.

FIG. 1 depicts an example embodiment of a wireless communication network 100 according to the subject matter disclosed herein. The example embodiment of the wireless network depicted in FIG. 1 is for illustration only. Other embodiments of the wireless network 100 may be used without departing from the principles of the subject matter disclosed herein.

As depicted in FIG. 1, the wireless network 100 includes a gNB 101 (e.g., base station, BS), a gNB 102, and a gNB 103. The gNB 101 may communicate with the gNB 102 and the gNB 103. The gNB 101 may also communicate with at least one network 130, such as the internet, a proprietary Internet Protocol (IP) network, or other data network.

The gNB 102 may provide wireless broadband access to the network 130 for a first plurality of UEs within a coverage area 120 of the gNB 102. The first plurality of UEs may include a UE 111 that may be located in a small business (SB); a UE 112 that may be located in an enterprise I; a UE 113 that may be located in a WiFi hotspot (HS); a UE 114 that may be located in a first residence I; a UE 115 that may be located in a second residence I; and a UE 116 that may be a mobile device (M), such as, but not limited to, a cell phone, a wireless laptop, a wireless PDA, or the like. The gNB 103 may provide wireless broadband access to the network 130 for a second plurality of UEs within a coverage area 125 of the gNB 103. The second plurality of UEs may include the UE 115 and the UE 116. In some embodiments, one or more of the gNBs 101-103 may communicate with each other and with the UEs 111-116 using 5G/NR, LTE, LTE-A, WiMAX, WiFi, and/or other wireless communication techniques.

Depending on the network type, the term "base station" or "BS" may refer to any component (or collection of components) configured to provide wireless access to a network, such as a transmit point (TP), a transmit-receive point (TRP), an enhanced base station (eNodeB or eNB), a 5G/NR base station (gNB), a microcell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably herein to refer to network infrastructure components that provide wireless access to remote terminals. Also, depending on the network type, the term "user equipment" or "UE" may refer to any component such as "mobile station," "subscriber station," "remote terminal," "wireless terminal," "receive point," or "user device." For the sake of convenience, the terms "user equipment" and "UE" may be used herein to refer to remote wireless equipment that wirelessly accesses a BS, whether the UE is a mobile device (such as, but not limited to, a mobile telephone or smartphone) or is normally considered a stationary device (such as, but not limited to, a desktop computer or vending machine).

Dotted lines depict approximate extents of the coverage areas 120 and 125, which are depicted as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 may include circuitry, programming, or a combination thereof, for efficient control signaling designed for improved resource utilization. In certain embodiments, and one or more of the gNBs 101-103 may include circuitry, programming, or a combination thereof, for efficient control signaling designed for improved resource utilization.

Although FIG. 1 depicts one example of a wireless network, various changes may be made to FIG. 1. For example, the wireless network 100 could include any number of gNBs and any number of UEs in any suitable arrangement. Also, the gNB 101 may communicate directly with any number of UEs and provide those UEs with wireless broadband access to the network 130. Similarly, each gNB 102-103 may communicate directly with the network 130 and provide UEs with direct wireless broadband access to the network 130. Further, the gNBs 101, 102, and/or 103 may provide access to other or additional external networks, such as, but not limited to, external telephone networks or other types of data networks.

FIG. 2 depicts an example embodiment of the gNB 102 according to the subject matter disclosed herein. The embodiment of the gNB 102 depicted in FIG. 2 is for illustration only, and the gNBs 101 and 103 of FIG. 1 may have the same or a similar configuration. However, gNBs come in a wide variety of configurations, and it should be understood that FIG. 2 does not limit the scope of the subject matter disclosed herein to any particular implementation of a gNB.

As depicted in FIG. 2, the gNB 102 may include multiple antennas 201a-201n, multiple radio frequency (RF) transceivers 202a-202n, receive (RX) processing circuitry 203, and transmit (TX) processing circuitry 204. The gNB 102 may also include a controller/processor 205, a memory 206, and/or a backhaul or network interface 207.

The RF transceivers 202a-202n may receive incoming RF signals from the antennas 201a-201n. The received RF signals may be signals transmitted by UEs in the network 100. The RF transceivers 202a-202n may down-convert the incoming RF signals to generate IF or baseband signals. The IF or baseband signals may be sent to the RX processing circuitry 203, which generates processed baseband signals by filtering, decoding, and/or digitizing the baseband or IF signals. The RX processing circuitry 203 may transmit the processed baseband signals to the controller/processor 255 for further processing.

The TX processing circuitry 204 may receive analog or digital data (such as, but not limited to, voice data, web data, e-mail, or interactive video game data) from the controller/processor 225. The TX processing circuitry 204 may encode, multiplex, and/or digitize the outgoing baseband data to generate processed baseband or IF signals. The RF transceivers 202a-202n may receive the outgoing processed baseband or IF signals from the TX processing circuitry 204 and may up-convert the baseband or IF signals to RF signals that are transmitted via the antennas 201a-201n.

The controller/processor 205 may include one or more processors or other processing devices that may control the overall operation of the gNB 102. For example, the controller/processor 205 may control the reception of forward channel signals and the transmission of reverse channel signals by the RF transceivers 202a-202n, the RX processing circuitry 203, and the TX processing circuitry 204 in accordance with well-known principles. The controller/processor 205 may support additional functions as well, such as more advanced wireless communication functions. For instance, the controller/processor 205 may support beamforming or directional-routing operations in which outgoing/incoming signals from/to multiple antennas 201a-201n may be weighted differently to effectively steer the outgoing signals in a desired direction. Any of a wide variety of other functions may be supported in the gNB 102 by the controller/processor 205.

The controller/processor 205 may also be capable of executing programs and other processes resident in the memory 206, such as an operating system (OS). The controller/processor 205 may move data into or out of the memory 206, which may be coupled to the controller/processor 205, as required by an executing process. Part of the memory 206 may include a random access memory (RAM), and another part of the memory 206 may include a Flash memory or other read-only memory (ROM).

The controller/processor 205 may also be coupled to the backhaul or network interface 207. The backhaul or network interface 207 may allow the gNB 102 to communicate with other devices or systems over a backhaul connection or over a network. The interface 207 may support communications over any suitable wired or wireless connection(s). For example, when the gNB 102 is implemented as part of a cellular communication system (such as a gNB supporting 5G/NR, LTE, or LTE-A), the interface 207 may allow the gNB 102 to communicate with other gNBs over a wired or wireless backhaul connection. When the gNB 102 is implemented as an access point, the interface 207 may allow the gNB 102 to communicate over a wired or wireless local area network or over a wired or wireless connection to a larger network (such as the internet). The interface 207 may include any suitable structure supporting communications over a wired or wireless connection, such as an Ethernet or an RF transceiver.

Although FIG. 2 depicts one example of gNB 102, various changes may be made to FIG. 2. For example, the gNB 102 may include any number of each component shown in FIG. 2. As a particular example, an access point may include a number of interfaces 207, and the controller/processor 205 may support routing functions to route data between different network addresses. As another particular example, while shown as including a single instance of TX processing circuitry 204 and a single instance of RX processing circuitry 203, the gNB 102 may include multiple instances of each (such as one per RF transceiver). Also, various components in FIG. 2 may be combined, further subdivided, or omitted and additional components may be added according to particular needs.

FIG. 3 depicts an example embodiment of UE 116 according to the subject matter disclosed herein. The embodiment of the UE 116 depicted in FIG. 3 is for illustration only, and the UEs 111-115 of FIG. 1 could have the same or similar configuration. UEs, however, may come in a wide variety of configurations, and FIG. 3 does not limit a UE to be any particular implementation of a UE.

As depicted in FIG. 3, the UE 116 may include an antenna 301, an RF transceiver 302, TX processing circuitry 303, a microphone 304, and RX processing circuitry 305. The UE 116 may also include a speaker 360, a processor 307, an input/output (I/O) interface (IF) 308, a touchscreen 309 (or other input device), a display 310, and a memory 311. The memory 311 may include an OS 312 and one or more applications 313.

The RF transceiver 310 may receive an incoming RF signal, from the antenna 305 that has been transmitted by a gNB of the network 100. The RF transceiver 310 may down-convert the incoming RF signal to generate an intermediate frequency (IF) or baseband signal. The IF or baseband signal may be sent to the RX processing circuitry 325, which generates a processed baseband signal by filtering, decoding, and/or digitizing the baseband or IF signal. The RX processing circuitry 325 may transmit the processed baseband signal to the speaker 330 (such as for voice data) or to the processor 340 for further processing (such as for web browsing data).

The TX processing circuitry 303 may receive analog or digital voice data from the microphone 304 or other outgoing baseband data (such as web data, e-mail, or interactive video game data) from the processor 307. The TX processing circuitry 303 may encode, multiplex, and/or digitize the outgoing baseband data to generate a processed baseband or IF signal. The RF transceiver 302 may receive the outgoing processed baseband or IF signal from the TX processing circuitry 303 and up-convert the baseband or IF signal to an RF signal that is transmitted via the antenna 301.

The processor 307 may include one or more processors or other processing devices and may execute the OS 312 stored in the memory 311 in order to control the overall operation of the UE 116. For example, the processor 307 may control the reception of forward channel signals and the transmission of reverse channel signals by the RF transceiver 302, the TX processing circuitry 303, and the RX processing circuitry 305 in accordance with well-known principles. In some embodiments, the processor 307 may at least one microprocessor or microcontroller.

The processor 370 may also be capable of executing other processes and programs resident in the memory 311, such as processes for beam management. The processor 307 may move data into or out of the memory 311 as required by an executing process. In some embodiments, the processor 307 may be configured to execute the applications 313 based on the OS 361 or in response to signals received from gNBs or from an operator. The processor 307 may also be coupled to the I/O interface 308, which may provide the UE 116 with the ability to connect to other devices, such as, but not limited to, laptop computers and handheld computers. The I/O interface 308 is the communication path between these accessories and the processor 307.

The processor 307 may also be coupled to the touchscreen 309 and the display 310. An operator of the UE 116 may use the touchscreen 309 to enter data into the UE 116. The display 310 may be a liquid crystal display, light emitting diode display, or other display capable of rendering text and/or at least limited graphics, such as from web sites.

The memory 311 may be coupled to the processor 307. Part of the memory 311 may include RAM and another part of the memory 311 may include a Flash memory or other ROM.

Although FIG. 3 depicts one example embodiment of the UE 116, various changes may be made to FIG. 3. For example, various components in FIG. 3 may be combined, further subdivided, or omitted and additional components may be added according to particular needs. As a particular example, the processor 340 may be divided into multiple processors, such as one or more central processing units (CPUs) and one or more graphics processing units (GPUs). Also, while FIG. 3 depicts the UE 116 configured as a mobile telephone or smartphone, UEs may be configured to operate as other types of mobile or stationary devices.

To meet the demand for wireless data traffic that has increased since deployment of 4G communication systems, efforts have been made to develop an improved 5G/NR or pre-5G/NR communication system. Therefore, the 5G/NR or pre-5G/NR communication system may be also referred to as a "beyond 4G network" or a "post LTE system." The 5G/NR communication system may be considered to be implemented in higher frequency (mmWave) bands, e.g., 28 GHz or 60 GHz bands or, in general, above 6 GHz bands, to accomplish higher data rates or in lower frequency bands, such as below 6 GHz, to enable robust coverage and mobility support. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques as used in 5G/NR communication systems. Additionally, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system may include a downlink (DL) that refers to transmissions from a base station or one or more transmission points to UEs and an uplink (UL) that refers to transmissions from UEs to a base station or to one or more reception points.

A unit for DL signaling or for UL signaling on a cell may be referred to as a slot and may include one or more symbols. A symbol may also serve as an additional time unit. A frequency (or bandwidth (BW)) unit may be referred to as a resource block (RB). One RB may include a number of sub-carriers (SCs). For example, a slot may have duration of 0.5 milliseconds or 1 millisecond, include 14 symbols, and an RB may include 12 SCs with inter-SC spacing of 30 kHz or 15 kHz, respectively. A unit of one RB in frequency and one symbol in time may be referred to as physical RB (PRB).

DL signals may include data signals conveying information content, control signals conveying DL control information (DCI), and reference signals (RS) that may also be known as pilot signals. A gNB transmits data information or DCI through respective physical DL shared channels (PDSCHs) or physical DL control channels (PDCCHs). A PDSCH or a PDCCH may be transmitted over a variable number of slot symbols including one slot symbol. For brevity, a DCI format scheduling a PDSCH reception by a UE may be referred to as a DL DCI format and a DCI format scheduling a PUSCH transmission from a UE is referred to as an UL DCI format.

A gNB may transmit one or more of multiple types of RS including channel state information RS (CSI-RS) and demodulation RS (DM-RS). A CSI-RS may be primarily intended for UEs to perform measurements and provide channel state information (CSI) to a gNB. For channel measurement, non-zero power CSI-RS (NZP CSI-RS) resources may be used. For interference measurement reports (IMRs), CSI interference measurement (CSI-IM) resources may be used. A CSI process may include NZP CSI-RS and CSI-IM resources.

A UE may determine CSI-RS transmission parameters through DL control signaling or higher-layer signaling, such as radio resource control (RRC) signaling, from a gNB. Transmission instances of a CSI-RS may be indicated by DL control signaling or be configured by higher layer signaling. A DM-RS may be typically transmitted only within a BW of a respective PDCCH or PDSCH and a UE may use the DM-RS to demodulate data or control information.

FIG. 4A depicts an example embodiment of a DL slot structure 400 according to the subject matter disclosed herein. The example embodiment of the DL slot structure 400 depicted in FIG. 4A is for illustration only. FIG. 4 does not limit the scope of the subject matter disclosed herein to any particular implementation. It should be noted that in the DL slot structure 400 described as follows, the DCI information need not be located as depicted in FIG. 4A and may be located elsewhere as appropriate.

As depicted in FIG. 4A, a DL slot 401 may include $N_{symb}^{DL}$ symbols 402 in which a gNB may transmit, for example, data information, DCI, or DM-RS. A DL system BW may include $N_{RB}^{DL}$ RBs. Each RB may include $N_{SC}^{RB}$ SCs. A UE may be assigned $M_{PDSCH}$ RBs for a total of $M_{SC}^{PDSCH}=M_{PDSCH} \cdot N_{SC}^{RB}$ SCs 403 for a PDSCH transmission BW. A PDCCH conveying DCI may be transmitted over control channel elements (CCEs) that are substantially spread across the DL system BW. A first slot symbol 404 may be used by the gNB to transmit PDCCH. A second slot symbol 405 may be used by the gNB to transmit PDCCH or PDSCH. Remaining slot symbols 406 may be used by the gNB to transmit PDSCH and CSI-RS. In some slots, the gNB may also transmit synchronization signals and channels that convey system information, such as synchronization signals and primary broadcast channel (SS/PBCH) blocks.

UL signals may also include data signals conveying information content, control signals conveying UL control information (UCI), DM-RS associated with data or UCI demodulation, sounding RS (SRS) enabling a gNB to perform UL channel measurement, and a random access (RA) preamble enabling a UE to perform random access. A UE may transmit data information or UCI through a respective physical UL shared channel (PUSCH) or a physical UL control channel (PUCCH). A PUSCH or a PUCCH may be transmitted over a variable number of symbols in a slot including one symbol. When a UE simultaneously transmits data information and UCI, the UE may multiplex both in a PUSCH.

A UCI may include hybrid automatic repeat request acknowledgement (HARQ-ACK) information, indicating correct or incorrect detection of data transport blocks (TBs) or of code block groups (CBGs) in a PDSCH, scheduling request (SR) indicating whether a UE has data in the buffer to the UE, and CSI reports enabling a gNB to select appropriate parameters for PDSCH or PDCCH transmissions to a UE.

A CSI report from a UE may include a channel quality indicator (CQI) informing a gNB of a largest modulation and coding scheme (MCS) for the UE to detect a TB with a predetermined block error rate (BLER), such as a 10% BLER, a precoding matrix indicator (PMI) informing a gNB how to combine signals from multiple transmitter antennas in accordance with a multiple input multiple output (MIMO) transmission principle, a CSI-RS resource indicator (CRI) indicating a CSI-RS resource associated with the CSI report, and a rank indicator (RI) indicating a transmission rank for a PDSCH.

A UL RS may include DM-RS and SRS. A DM-RS may typically be transmitted only within a BW of a respective PUSCH or PUCCH transmission. A gNB may use a DM-RS to demodulate information in a respective PUSCH or PUCCH. A SRS may transmitted by a UE to provide a gNB with an UL CSI and, for a TDD system, an SRS transmission can also provide a PMI for DL transmission. Additionally, in order to establish synchronization or an initial higher-layer connection with a gNB, a UE may transmit a physical random access channel (PRACH).

FIG. 4B depicts an example embodiment of a UL slot structure 410 for PUSCH transmission or PUCCH transmission according to the subject matter disclosed herein. The embodiment of the UL slot structure 410 depicted in FIG. 4B is for illustration only. FIG. 4B does not limit the scope of the subject matter disclosed herein to any particular implementation. It should be noted that in the UL slot structure 410 described as follows, the UCI information need not be located as depicted in FIG. 4B and may be located elsewhere as appropriate.

As depicted in FIG. 4B, a slot 411 may include $N_{symb}^{UL}$ symbols 412 in which a UE transmits, for example, data information, UCI, or DM-RS. An UL system BW may include N RBs. Each RB may include $N_{SC}^{RB}$. A UE may be assigned $M_{PUXCH}$ RBs for a total of $M_{SC}^{PUXCH}=M_{PUXCH} \cdot N_{SC}^{RB}$ SCs 413 for a PUSCH transmission BW ("X"="S") or for a PUCCH transmission BW ("X"="C"). The last one or more symbols of a slot may be used, for example, to multiplex SRS transmissions 414 or short PUCCH transmissions from one or more UEs.

Figure 5A:
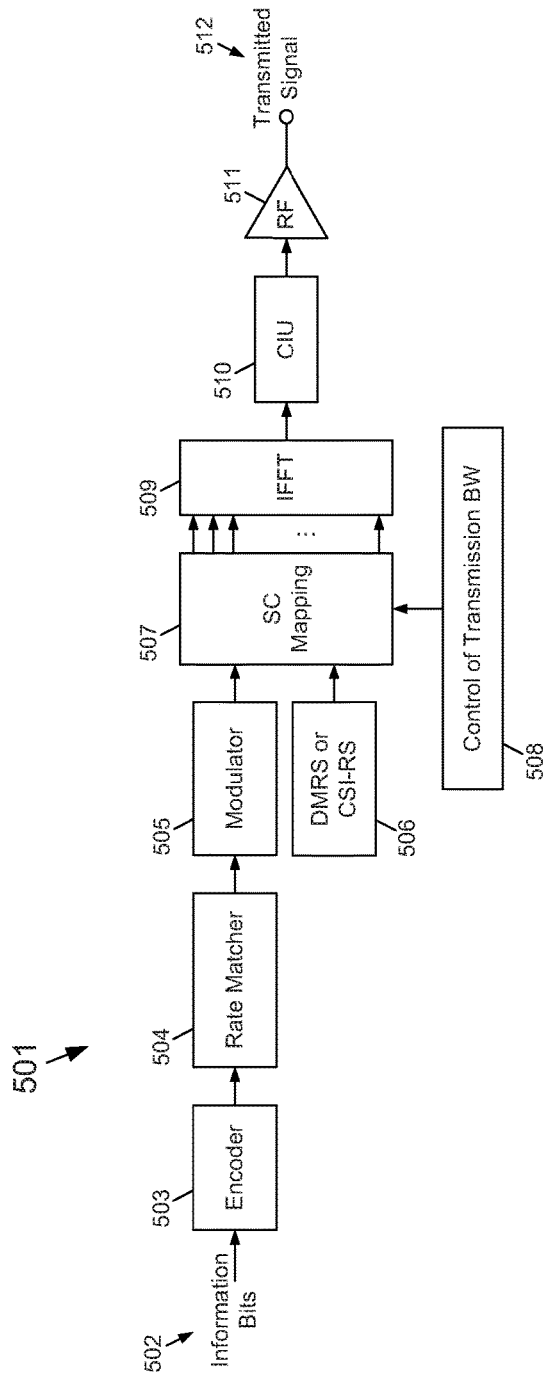
FIG. 5A depicts a block diagram of an example embodiment of a transmitter structure using OFDM according to the subject matter disclosed herein.

FIG. 5A depicts a block diagram of an example embodiment of a transmitter structure 501 using OFDM according to the subject matter disclosed herein. The embodiment of the transmitter structure 501 depicted in FIG. 5A is for illustration only and an actual implementation may have the same or a similar configuration. FIG. 5A does not limit the scope of the subject matter disclosed herein to any particular implementation.

As depicted in FIG. 5A, information bits, such as DCI bits or data information bits 502, may be encoded by an encoder module 503, rate matched to assigned time/frequency resources by a rate matcher module 504 and modulated by a modulator module 505. Subsequently, modulated encoded symbols and DM-RS or CSI-RS module 506 may be mapped to SCs by an SC mapping module 507 controlled by a transmission bandwidth module 508. An inverse fast Fourier transform (IFFT) may be performed by a filter module 509. A cyclic prefix (CP) may be added to the output of the filter module 509. The resulting signal may be filtered by common interface unit (CIU) filter module 510 and transmitted by an RF module 511 as a transmitted signal 512.

Figure 5B:
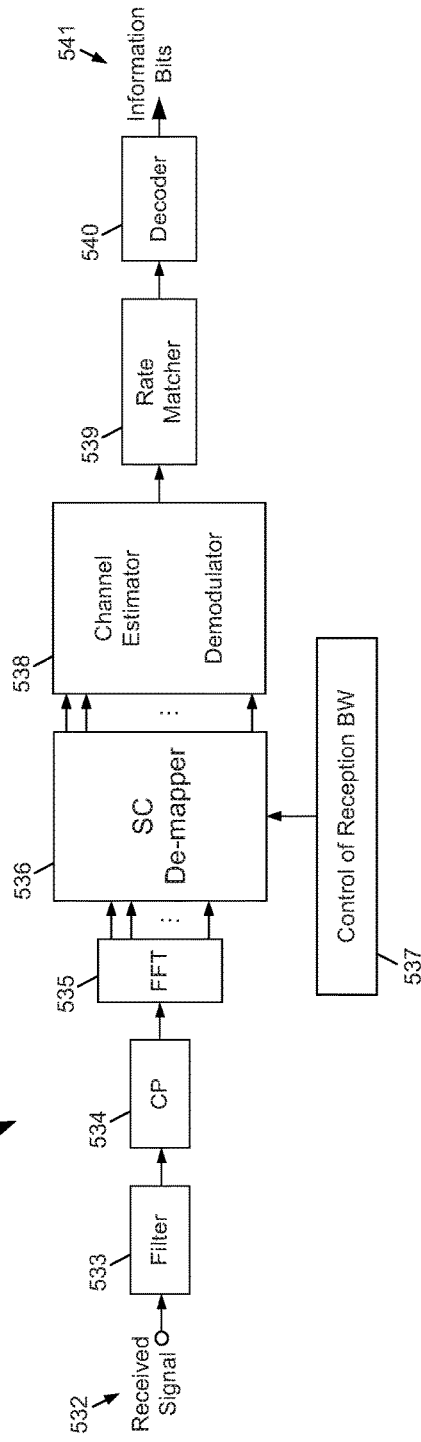
FIG. 5B depicts a block diagram of an example embodiment of an OFDM receiver structure according to the subject matter disclosed herein.

FIG. 5B depicts a block diagram of an example embodiment of an OFDM receiver structure 531 according to the subject matter disclosed herein. The embodiment of the receiver structure 531 depicted in FIG. 5B is for illustration only and an actual implementation may have the same or a similar configuration. FIG. 5B does not limit the scope of the subject matter disclosed herein to any particular implementation. As depicted in FIG. 5B, a received signal 532 may be filtered by a filter module 533. A CP removal module 534 may remove a cyclic prefix. A filter module 535 may apply a fast Fourier transform (FFT). An SC de-mapping module 536 may de-map SCs selected by BW selector module 537. Received symbols may be demodulated by a channel estimator and a demodulator module 538. A rate de-matcher module 539 may restore a rate matching, and a decoder module 540 may decode the resulting bits to provide data information bits 541. DL transmissions and UL transmissions may be based on an orthogonal frequency division multiplexing (OFDM) waveform that includes a variant using a DFT preceding that is known as DFT-spread-OFDM.

As previously mentioned, an objective in the 3GPP Rel-17 SID on RedCap NR devices is to support the same set of use cases in FR2 as in case of FR1. Beam refinement may be a key feature for FR2 operation in NR. An important issue relates to enabling a beam refinement procedure for RedCap UEs that are in a RRC_INACTIVE state (also referred to herein as a RRC Inactive state or an inactive mode). Accordingly, the subject matter disclosed herein provides a set of beam refinement procedures to enable RedCap in an inactive mode transmission in FR2.

RRC States in NR (3GPP TS 38.331)

A UE is either in a RRC_CONNECTED (connected) state or in a RRC_INACTIVE (inactive) state while an RRC connection has been established. If this is not the case, i.e., no RRC connection has been established and the UE is in a RRC_IDLE state. The three different RRC states may be further characterized as set forth in Tables 2-4.

TABLE 2

RRC_IDLE State

UE specific Discontinuous Reception (DRX) may be configured by upper layers;
UE controlled mobility based on network configuration;
The UE:
Monitors Short Messages transmitted with Paging Radio Network Temporary Identifier (P-RNTI) over Downlink Control Indicator (DCI);
Monitors a Paging channel for Core Network (CN) paging using 5G S-Temporary Mobile Station Identifier (5G-S-TMSI);
Performs neighboring cell measurements and cell (re-)selection;
Acquires system information and can send a System Information (SI) request (if configured); and
Performs logging of available measurements together with location and time for logged measurement configured UEs.

TABLE 3

RRC_IN ACTIVE State

A UE specific DRX may be configured by upper layers or by RRC layer;
UE controlled mobility based on network configuration;
The UE stores the UE Inactive AS context;

TABLE 3-continued

RRC_IN ACTIVE State

A RAN-based notification area is configured by the RRC layer;
The UE:
Monitors Short Messages transmitted with P-RNTI over DCI (see clause 6.5);
Monitors a Paging channel for CN paging using 5G-S-TMSI and RAN paging using full RNTI;
Performs neighboring cell measurements and cell (re-)selection;
Performs RAN-based notification area updates periodically and when moving outside the configured RAN-based notification area;
Acquires system information and can send SI request (if configured); and
Performs logging of available measurements together with location and time for logged measurement configured UEs.

TABLE 4

RRC_CONNECTED State

The UE stores the AS context;
Transfer of unicast data to/from UE;
At lower layers, the UE may be configured with a UE specific DRX;
For UEs supporting Carrier Aggregation (CA), use of one or more Secondary Cells (Scells), aggregated with the Special Cell (SpCell), for increased bandwidth;
For UEs supporting Dual Connectivity (DC), use of one Secondary Cell Group (SCG), aggregated with the Master Cell Group (MCG), for increased bandwidth;
Network controlled mobility within NR and to/from Evolved Universal Terrestrial Radio Access (E-UTRA);
The UE:
Monitors Short Messages transmitted with P-RNTI over DCI (see clause 6.5), if configured;
Monitors control channels associated with the shared data channel to determine if data is scheduled for it;
Provides channel quality and feedback information;
Performs neighboring cell measurements and measurement reporting; and
Acquires system information.

FIGS. 6A and 6B respectively show a comparison of signaling involved in a legacy idle-to-connected transition and an inactive-to-connected transition according to the subject matter disclosed herein. In both FIGS. 6A and 6B, time is relative and time increases in a downwardly direction. As may be observed from FIGS. 6A and 6B, an inactive-to-connected transition (FIG. 6B) may be faster and may involve far less overhead signaling than a legacy idle-to-connected transition (FIG. 6A). These differences may be because a RRC connection is maintained for an inactive-to-connected transition (FIG. 6B).

FIG. 7 shows an overview of a UE RRC state machine 700 and state transitions in NR. A UE has only one RRC state in NR at any given time. When a UE is in a NR RRC_CONNECTED state 701, the UE may transition to a NR RRC_INACTIVE state 702 by a resume/release operation with suspend, or to a NR RRC_IDLE state 703 by an establish/release operation. When a UE is in a NR RRC_INACTIVE state 702, the UE may transition to a NR RRC_CONNECTED state 701 by a resume/release operation with suspend, or to a NR RRC_IDLE state 703 by a release operation. Lastly, when a UE is in a NR RRC_IDLE state 703, the UE may transition to a NR RRC_CONNECTED state 701 by an establish/release operation. A UE cannot transition directly from a NR RRC_IDLE state 703 to to NR RRC_INACTIVE state 702.

Rel-17 Small Data In-Active State (3GPP RP-193252 Work Item on NR Small Data Transmissions in INACTIVE State)

Rel-15 of the NR specification may be mainly directed to relatively larger payloads and relatively higher bit rates. In Rel-17, transmission of smaller payloads is intended to be further optimized to provide an increase in UE battery life, and to reduce the overhead associated with control-signaling overhead, as well as improve network capacity. A main-use case is considered to be a mobile-originated (i.e., uplink data) connection in which a UE is in a RRC Inactive state, but a mobile-terminated (i.e., downlink data) connection may also be considered. Solutions may be based on, for example, Early Data Transmission (EDT) in a RRC Inactive state; the Rel-15 small uplink (UL) data study captured in TR 38.804; 2-step or 4-step RACH; Preconfigured Uplink Resources (PUR); etc. In view of these considerations, the subject matter disclosed herein provides a generic solution that supports a wide range of use cases, and which, e.g., supports transmission of subsequent data in either an uplink or a downlink.

Beam Management in RRC Connected State in Rel-15 (3GPP TR 38.802-6.1.6.1 Beam Management)

FIG. 8 shows an overview 800 of beam management in a RRC_Connected state. In NR, beam management may be defined as follows. Beam management may include a set of Layer 1/Layer 2 (L1/L2) procedures to acquire and maintain a set of one or more TRPs and/or UE beams that may be used for DL and UL transmission/reception, which may include at least following aspects. Regarding beam determination, for TRP(s) or for a UE, beam determination is based on a selection of its own Tx/Rx beam(s). Regarding beam measurement, for TRP(s) or UE, beam measurement is based on measuring characteristics of received beamformed signals. Regarding beam reporting, a UE is to report information of beamformed signal(s) based on a beam measurement. Regarding beam sweeping, such an operation is to cover a spatial area with beams transmitted and/or received during a time interval in a predetermined way.

Also, the following may be defined as Tx/Rx beam correspondence at a TRP and a UE. Tx/Rx beam correspondence at a TRP holds if at least one of the following two conditions is satisfied: (1) a TRP is able to determine a TRP Rx beam for the uplink reception based on a UEs downlink measurement on one or more Tx beams of the TRP; or (2) a TRP is able to determine a TRP Tx beam for the downlink transmission based on a TRPs uplink measurement on one or more Rx beams of the TRP.

Tx/Rx beam correspondence at a UE holds if at least one of the following is satisfied: (1) a UE is able to determine a UE Tx beam for an uplink transmission based on a UEs downlink measurement on one or more Rx beams of the UE; (2) a UE is able to determine a UE Rx beam for a downlink reception based on an indication from a TRP based on an uplink measurement on one or more Tx beams of the UE; or (3) capability indication of UE beam correspondence related information to TRP is supported.

The following DL L1/L2 beam management procedures are supported within one or multiple TRPs. Procedure P-1 is used to enable UE measurement on different TRP Tx beams to support selection of TRP Tx beams/UE Rx beam(s). For beamforming at TRP, it typically includes a intra/inter-TRP Tx beam sweep from a set of different beams. For beamforming at UE, it typically includes a UE Rx beam sweep from a set of different beams. Procedure P-2 is used to enable UE measurement on different TRP Tx beams to possibly change inter/intra-TRP Tx beam(s). P-2 may be from a possibly smaller set of beams for beam refinement than in P-1. Note that P-2 may be a special case of P-1. Procedure P-3 is used to enable UE measurement on the same TRP Tx beam to change UE Rx beam in the case UE uses beamforming. At least network-triggered aperiodic beam reporting is supported under P-1, P-2, and P-3 related operations.

UE measurement based on RS for beam management (at least CSI-RS) may include K beams (in which K=the total number of configured beams), and UE reports measurement results of N selected Tx beams in which N is not necessarily fixed number. Note that the procedure based on RS for mobility purpose is not precluded. Reporting information at least include measurement quantities for N beam(s) and information indicating N DL Tx beam(s), if N<K. Specifically, when a UE is configured with K'>1 non-zero power (NZP) CSI-RS resources, a UE can report N' CRIs (CSI-RS Resource Indicator).

A UE may be configured with the following high-layer parameters for beam management: (1) N≥1 reporting settings, M≥1 resource settings in which the links between reporting settings and resource settings are configured in the agreed CSI measurement setting; (2) CSI-RS based P-1 and P-2 are supported with resource and reporting settings; and (3) P-3 may be supported with or without reporting setting. A reporting setting may at least include: (1) information indicating selected beam(s); (2) L1 measurement reporting; (3) time-domain behavior: e.g. aperiodic, periodic, semi-persistent; and (4) frequency-granularity if multiple frequency granularities are supported. A resource setting may at least include: (1) time-domain behavior (e.g., aperiodic, periodic, semi-persistent); (2) RS type—at least NZP CSI-RS; (3) at least one CSI-RS resource set with each CSI-RS resource set having K≥1 CSI-RS resources, and some parameters of K CSI-RS resources can be the same, e.g. port number, time-domain behavior, density and periodicity if any.

At least one of the two following alternatives Alt 1 and Alt 2 of beam report may be supported. For the first alternative Alt 1: a UE reports information about TRP Tx Beam(s) that can be received using selected UE Rx beam set(s) in which a Rx beam set refers to a set of UE Rx beams that are used for receiving a DL signal. Note that it is an UE implementation issue for how to construct the Rx beam set. One example may be that each of Rx beam in a UE Rx beam set corresponds to a selected Rx beam in each panel. For UEs having more than one UE Rx beam sets, the UE can report TRP Tx Beam(s) and an identifier of the associated UE Rx beam set per reported TX beam(s). It should be noted that different TRP Tx beams reported for the same Rx beam set can be received simultaneously at the UE, and different TRP TX beams reported for different UE Rx beam set may not be possible to be received simultaneously at the UE.

For the second alternative Alt 2: a UE reports information about TRP Tx Beam(s) per UE antenna group basis in which the UE antenna group refers to a receive UE antenna panel or subarray. For UEs having more than one UE antenna group, the UE may report TRP Tx Beam(s) and an identifier of the associated UE antenna group per reported TX beam. It should be noted that different TX beams reported for different antenna groups may be received simultaneously at the UE, and different TX beams reported for the same UE antenna group may not be possible to be received simultaneously at the UE.

NR also supports the following beam reporting considering L groups in which L≥1 and each group refers to a Rx beam set (Alt1) or a UE antenna group (Alt 2) depending on which alternative is adopted. For each group l of the L groups, a UE reports at least the following information: Information indicating group at least for some cases; measurement quantities for Nl beam(s) (supporting L1 RSRP and CSI report (when CSI-RS is for CSI acquisition)); and information indicating Nl DL Tx beam(s) when applicable.

The group-based beam reporting may be configurable on a per UE basis. The group-based beam reporting may be turned off based on a per UE basis, e.g., when L=1 or Nl=1. Note that no group identifier is reported when group-based beam reporting is turned off.

NR supports that a UE may trigger a mechanism to recover from a beam failure event. A beam-failure event occurs when the quality of beam-pair link(s) of an associated control channel falls sufficiently low (e.g., in comparison to a threshold, or a time-out of an associated timer). A mechanism to recover from a beam-failure event may be triggered when beam failure occurs. Note that here the beam-pair link is used for convenience, and may or may not be used in the specification. A network may explicitly configure a UE with resources for UL transmission of signals for recovery purpose. Configurations of resources may be supported in which the base station is listening from all or partial directions, e.g., a random access region. The UL transmission/ resources to report a beam failure may be located in the same time instance as PRACH (resources orthogonal to PRACH resources) or at a time instance (configurable for a UE) different from PRACH. Transmission of a DL signal is supported for allowing the UE to monitor the beams for identifying new potential beams.

NR supports beam management with and without a beam-related indication. When a beam-related indication is provided, information pertaining to a UE-side beamforming/ receiving procedure used for CSI-RS-based measurement may be indicated through QCL to UE. NR supports using the same or different beams on a control channel and the corresponding data channel transmissions.

For NR-PDCCH transmission supporting robustness against a beam-pair link blocking, a UE may be configured to monitor NR-PDCCH on M beam pair links simultaneously in which M≥1 and the maximum value of M may depend at least on UE capability. A UE may be configured to monitor NR-PDCCH on different beam-pair link(s) in different NR-PDCCH OFDM symbols. Parameters related to UE Rx beam setting for monitoring NR-PDCCH on multiple beam pair links may be configured by higher-layer signaling or MAC CE and/or considered in the search space design. At least, NR supports indication of spatial QCL assumption between an DL RS antenna port(s), and DL RS antenna port(s) for demodulation of DL control channel. Candidate signaling methods for a beam indication for a NR-PDCCH (i.e., configuration method to monitor NR-PDCCH) include MAC CE signaling, RRC signaling, DCI signaling, specification-transparent and/or implicit method, and a combination of these signaling methods. Note that an indication may not be needed for some cases.

For reception of unicast DL data channel, NR supports an indication of spatial QCL assumption between DL RS antenna port(s) and DMRS antenna port(s) of a DL data channel. Information indicating the RS antenna port(s) may be indicated via DCI (downlink grants). The information indicates the RS antenna port(s) that is QCL-ed with DMRS antenna port(s). Different set of DMRS antenna port(s) for the DL data channel may be indicated as QCL with different set of RS antenna port(s). Note that an indication may not be needed for some cases.

On-Demand SIB Provision in NR (3GPP TS 38.331)

Other SI are carried in System Information (SI) messages, which are transmitted on the DL-SCH. An SIB1 message may include scheduling information for all SI messages. Only Service Based Interfaces (SIBs) having the same periodicity can be mapped to the same SI message. Each SI message is sent within periodically occurring time-domain windows called SI-windows and only one window length is defined for all SI messages. Each SI message is sent within the corresponding SI-window, and the SI-windows of different SI messages do not overlap.

An SI message may be transmitted a number of times within the SI-window. Any SIB except SIB1 may be configured to be either cell specific or area specific, using an indication in SIB1.

Other SI can be transmitted by being periodically broadcast on DL-SCH; broadcast on-demand on DL-SCH (i.e. upon explicit request from UEs); or sent in a dedicated manner on DL-SCH to UEs in RRC_CONNECTED.

Procedure for Requesting On-Demand SI

For UEs in RRC_IDLE and RRC_INACTIVE states, a request for Other SI triggers a random access procedure. After reading SI scheduling information from a SIB1 message, a UE determines broadcast status (via si-BroadcastStatus) of an SI message. This field indicates if one or several required SIBs within the SI-message are being broadcasted or not. If si-BroadcastStatus is set to "broadcasting," the UE would acquire the concerned SIB(s) normally. If si-BroadcastStatus is set to "notbroadcasting," the UE would proceed with a RA procedure to acquire those SIB(s). For this purpose, if the network configures the UE with PRACH resources for a SI request, a contention-free random access (CFRA) procedure is used, otherwise contention-based random access (CBRA) procedure is used.

Figure 9:
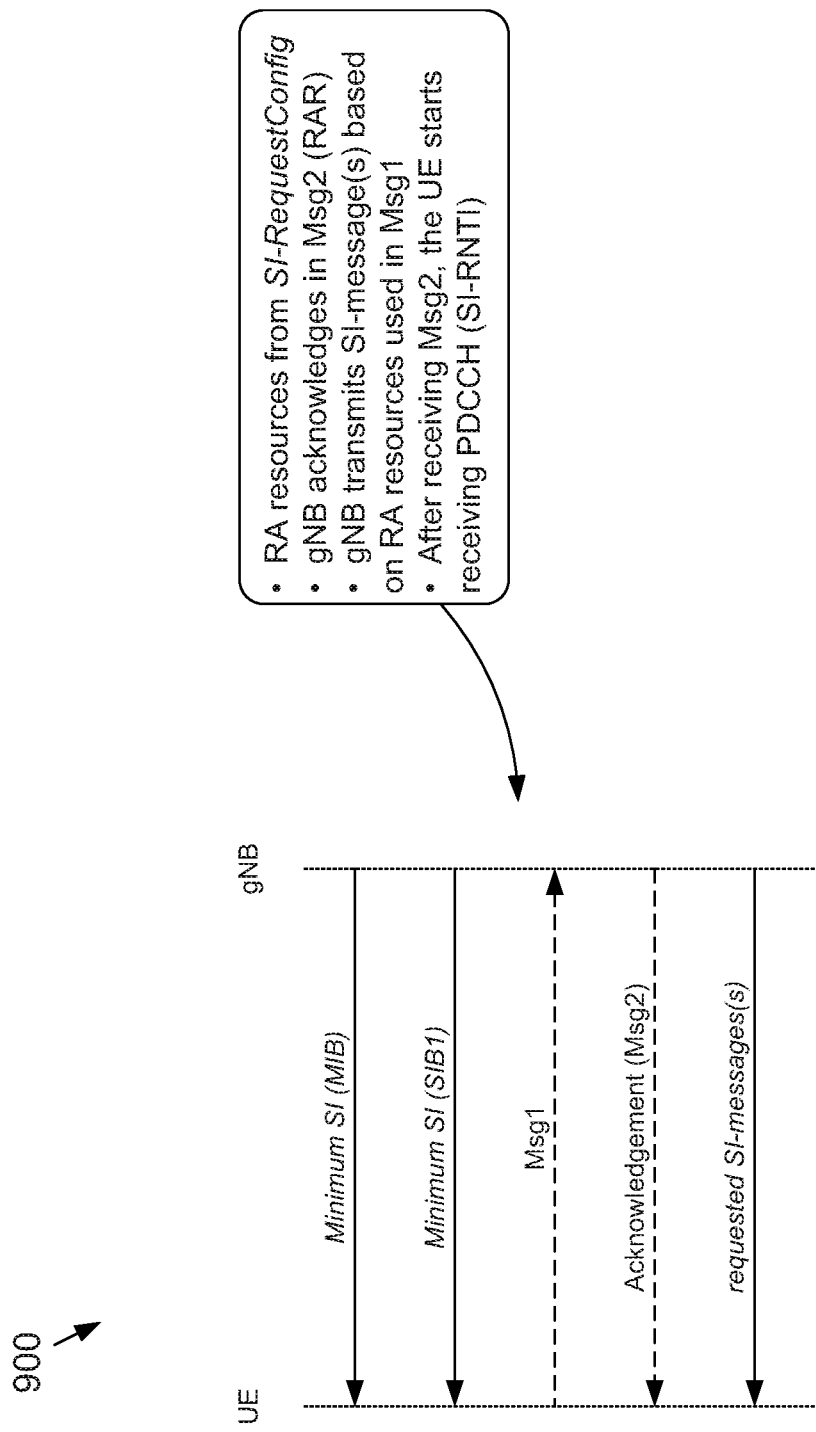
FIG. 9 depicts an overview of an example message sequence for a system information request using a contention-free random access procedure.
Figure 10:
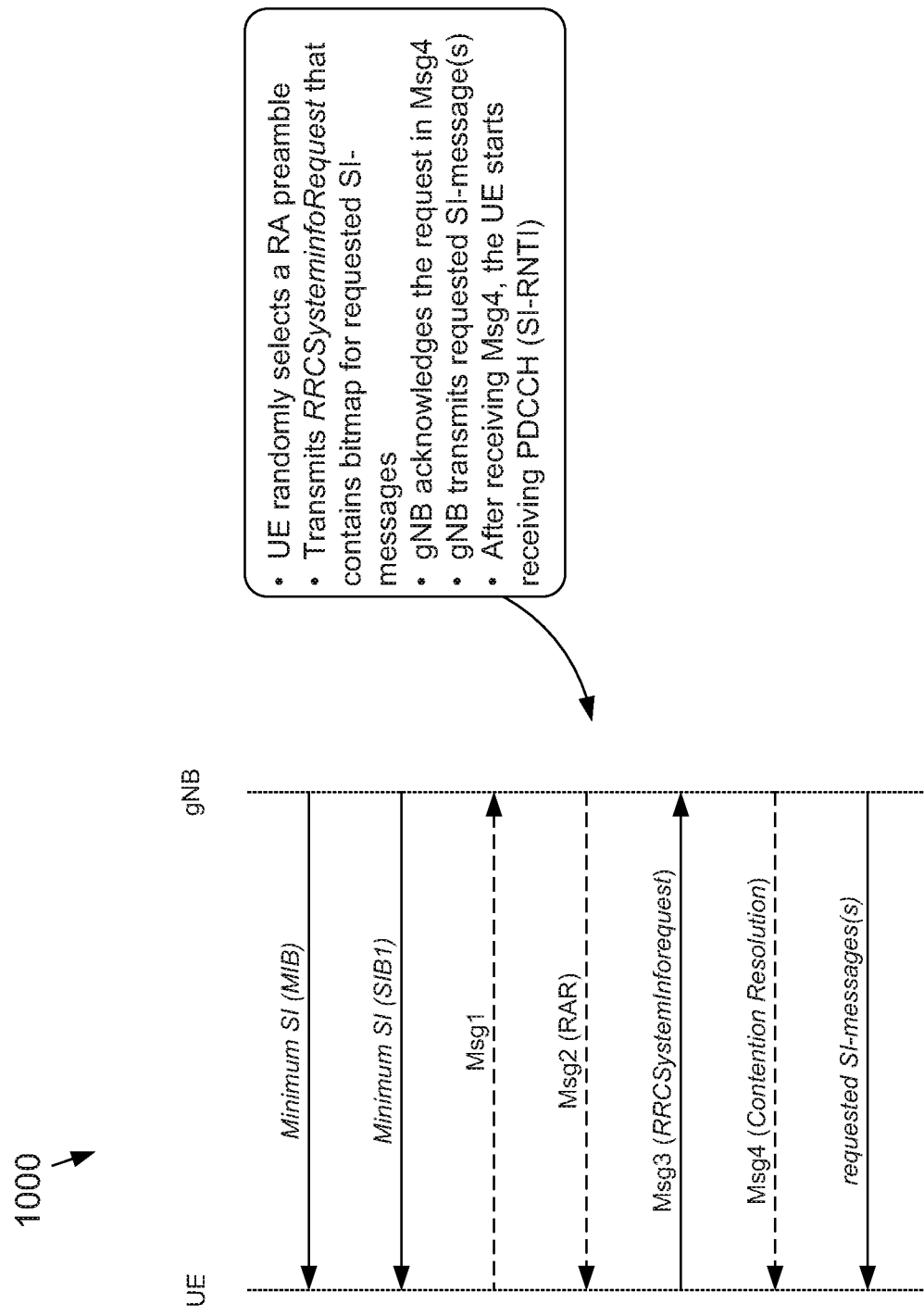
FIG. 10 depicts an overview of an example message sequence for a system information request using a contention-based random access procedure.

FIG. 9 depicts an overview of an example message sequence 900 for a SI request using a CFRA procedure. FIG. 10 depicts an overview of an example message sequence 1000 for SI request using a CBRA procedure.

There is no exact timing after which a UE starts monitoring SI. A UE may start monitoring slightly earlier or later than the actual start of the SI transmission, but it should be an issue as long as the SI is transmitted for reasonable amount of time. Regarding when a UE stops monitoring for a SI in a situation in which reception of the SI keeps failing, the text below from TS 38.331 indicates that a UE repeats reception for multiple SI-windows at least until the end of modification period. Then, a UE may request the SI again, and the network behavior may be to transmit SI during modification period and then the network stops transmitting the SI. If the SI message was not received by the end of the SI-window, reception is repeated at the next SI-window occasion for the concerned SI message in the current modification period. Note that the UE is only required to acquire broadcasted SI message if the UE can acquire the SI message without disrupting unicast data reception, i.e., the broadcast and unicast beams are quasi co-located. It should also be noted that the UE is not required to monitor PDCCH monitoring occasion(s) corresponding to each transmitted SSB in SI-window. Additionally, if the concerned SI message was not received in the current modification period, handling of SI message acquisition is left to UE implementation.

Example Embodiments

Figure 11:
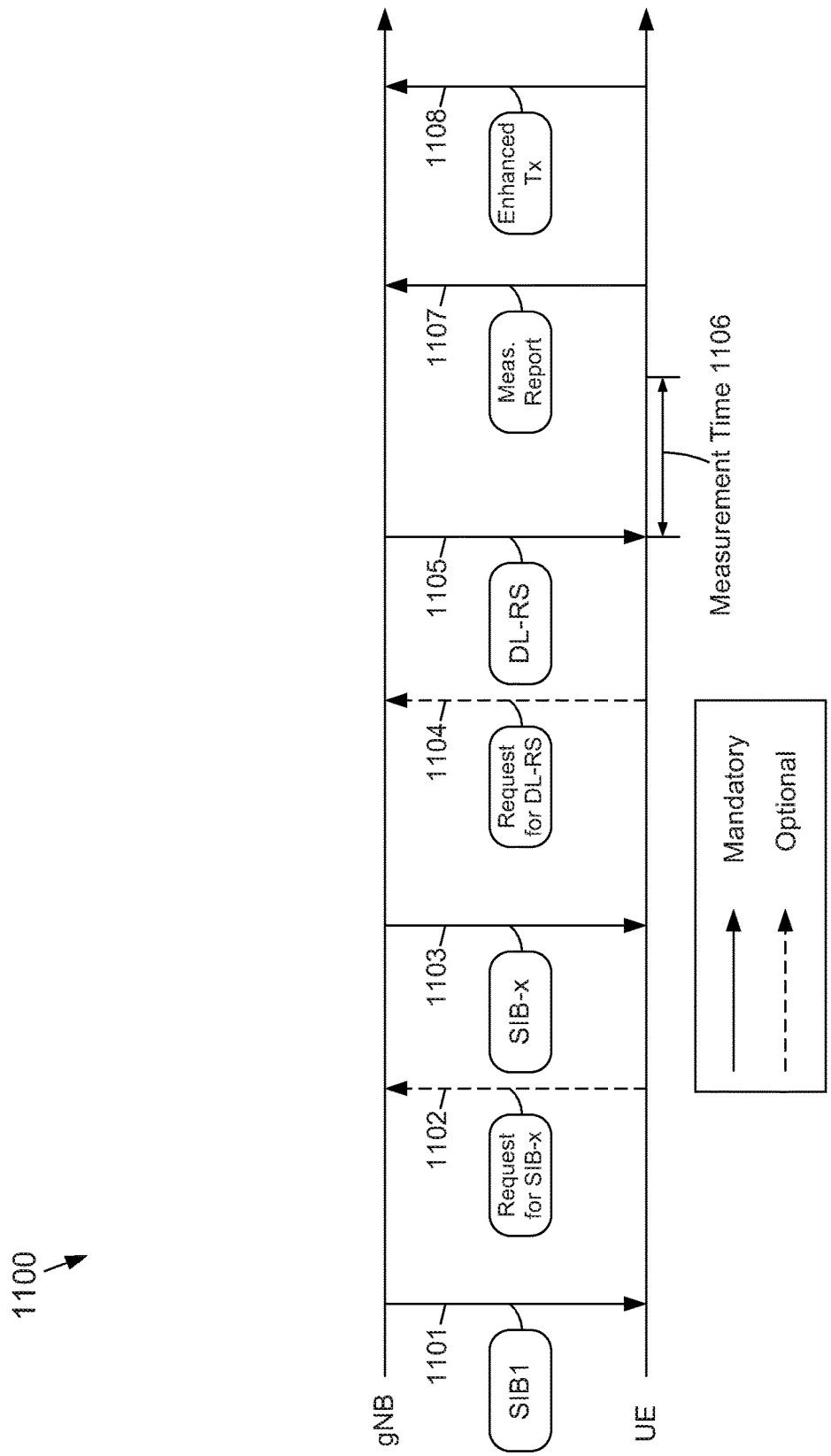
FIG. 11 depicts an overview of an example messaging sequence for a beam refinement process for a UE in a RRC_INACTIVE state according to the subject matter disclosed herein.

FIG. 11 depicts an overview of an example messaging sequence for a beam refinement process 1100 for a UE in a RRC_INACTIVE state according to the subject matter disclosed herein. In FIG. 11, time advances toward the right. The process 1100 allows UEs in a RRC_INACTIVE mode to perform an UL signal transmission and/or an enhanced DL signal reception mechanism (referred to herein as an enhanced Tx). In particular, the process 1100 allows a UE to indicate to a gNB which analog narrowbeam is optimal and should be used when receiving the enhanced Tx and/or transmitting to the UE.

A UE obtains System Information (SI) at 1101 by receiving a System Information Block 1 (SIB1) that includes information for receiving a subsequent SIB message (which is referred to herein as SIB-x). The information received in the SIB1 may include an indication of resources used for transmitting a SIB-x (e.g., time/frequency) and an indication of resources used for requesting a SIB-x (e.g., when a SIB-x is transmitted on-demand to allow a UE in a RRC_INACTIVE mode to request a SIB-x). A SIB-x may be transmitted periodically, semi-periodically, or on an on-demand basis in response to a request for a SIB-x. The contents of a SIB-x may include an indication of resources and configurations for subsequent DL-RS transmission and information relating to the measurement report.

If the SIB-x is being transmitted periodically or semi-periodically, the UE attempts to receive a SIB-x at 1103 either by monitoring for a periodically or semi-periodically transmitted SIB-x. If the SIB-x is transmitted on an on-demand basis, the UE sends a request for SIB-x at 1102, and the UE attempts to receive a SIB-x at 1102 in response to the on-demand request for a SIB-x that was sent by the UE at 1102.

If DL-RS messages are being transmitted periodically or semi-periodically, the UE may receive a set of downlink reference signals (DL-RS) in a DL-RS message at 1105. If the DL-RS messages are being transmitted on an on-demand basis, the UE may send a request for DL-RS message at 1104, in which case the UE may receive a set of downlink reference signals (DL-RS) in a DL-RS message at 1105 in response to the on-demand request for the DL-RS message. The UE may omit sending a request for SIB-x and directly request a set of DL-RS signals if the UE has previously acquired a SIB-x. The downlink reference signals may be used for performing a beam measurement. A DL-RS message may include an indication representing a collection of RS sets in which each set corresponds to a particular beam that the UE may measure and indicate to the gNB as a suitable beam for reception. For example, a DL-RS message may include an indication of the resources (time/frequency) and the type of reference signals for the DL-RS signals that are to be used.

At 1106, the UE performs beam measurement using the DL-RS signals indicated in the DL-RS message received at 1105. A time duration between different RS sets may be specified to account for suitable measurement times. At 1107, the UE sends a measurement report to the gNB based on the measurements performed at 1106. The content of the measurement report and the resources used for sending the measurement report may be indicated in the SIB-x received at 1103, in a dedicated UL grant, or in a combination of the SIB-x and a dedicated UL grant.

An enhanced TX may be performed at 1108. A predetermined time delay between the transmission of the measurement report at 1107 and the Enhanced Tx at 1108 may be defined to allow the gNB to accordingly adjust the reception beam based on the measurement report.

Table 5 below sets forth a summary of a beam refinement process for a UE in a RRC_Inactive mode according to the subject matter disclosed herein.

TABLE 5

| SIB-x acquisition | | DL-RS acquisition | | Beam measurement report | |
|---|---|---|---|---|---|
| Periodic | On-demand | Periodic | On-demand | Periodic | On-demand |
| SIB-x is periodically provided to UEs without explicit request. SIB-x includes the configuration for beam refinement measurement and report. | UE request SIB-x based on UL buffer status forUL transmission, or DL paging for DL reception, or measured RSRP and/or RSRQ of current DL beam is less than a threshold (due to beam blockage or intra or inter beam interference). SIB-x includes the configuration for beam refinement measurement and report. The resource used for beam report may be optionally allocated in e-Message 2 for both contention-based and contention-free SIB-x request. | DL-RS for beam refinement is periodically provided to UEs without UE explicit requesting, independent of UE request. | Upon UE request or NW request, DL-RS is provided a pre-defined number of times over a time window, Or broadcast periodically until UE or NW explicit requests to end. | Independent of other procedures, UE can report the beam measurement periodically, e.g., periodicity configured by the network. Alternatively, UE reports the beam measurement periodically until it becomes RRC_IDLE state or RRC_CONNECTED. | UE may report the beam measurement on-demand based on some events, e.g., when UE has UL data to transmit in the buffer or when UE is paged by the network to receive DL data, or detection of a beam failure by having measured RSRP and/or RSPQ less than a threshold for a predefined number of times, or based on an explicit command from the network via DL DCI or RRC message. |

TABLE 5-continued

| SIB-x acquisition | | DL-RS acquisition | | Beam measurement report | |
|---|---|---|---|---|---|
| Periodic | On-demand | Periodic | On-demand | Periodic | On-demand |
| Sent for each broad beam - significant overhead. Fast data transmission without latency due to beam refinement. | Less overhead based UE request or NW command. Latency due to iterations of beam refinement before the data transmission. | suitable for periodical traffic. Large overhead. | Less overhead based UE request or NW command. Latency due to iterations of beam refinement before the data transmission. | suitable for periodical traffic. Significant overhead. | Less overhead based UE request or NW command. Latency due to iterations of beam refinement before the data transmission. |

Beam Refinement in UE in an Inactive State

Beam refinement for a RedCap UE in a RRC_INACTIVE state may use a new SIB (referred to herein as SIB-x) for beam-refinement measurement and report configuration according to the subject matter disclosed herein. Additionally, a new e-Message 2 (E-msg2) may be used for allocating measurement report resources. The e-Message 2 is an evolved message that has more functionalities than a legacy message 2 (msg2). Further, a DL-RS for beam refinement may be requested by a UE, and a UE beam report may be sent from a UE that is in an RRC_INACTIVE state.

Figure 12:
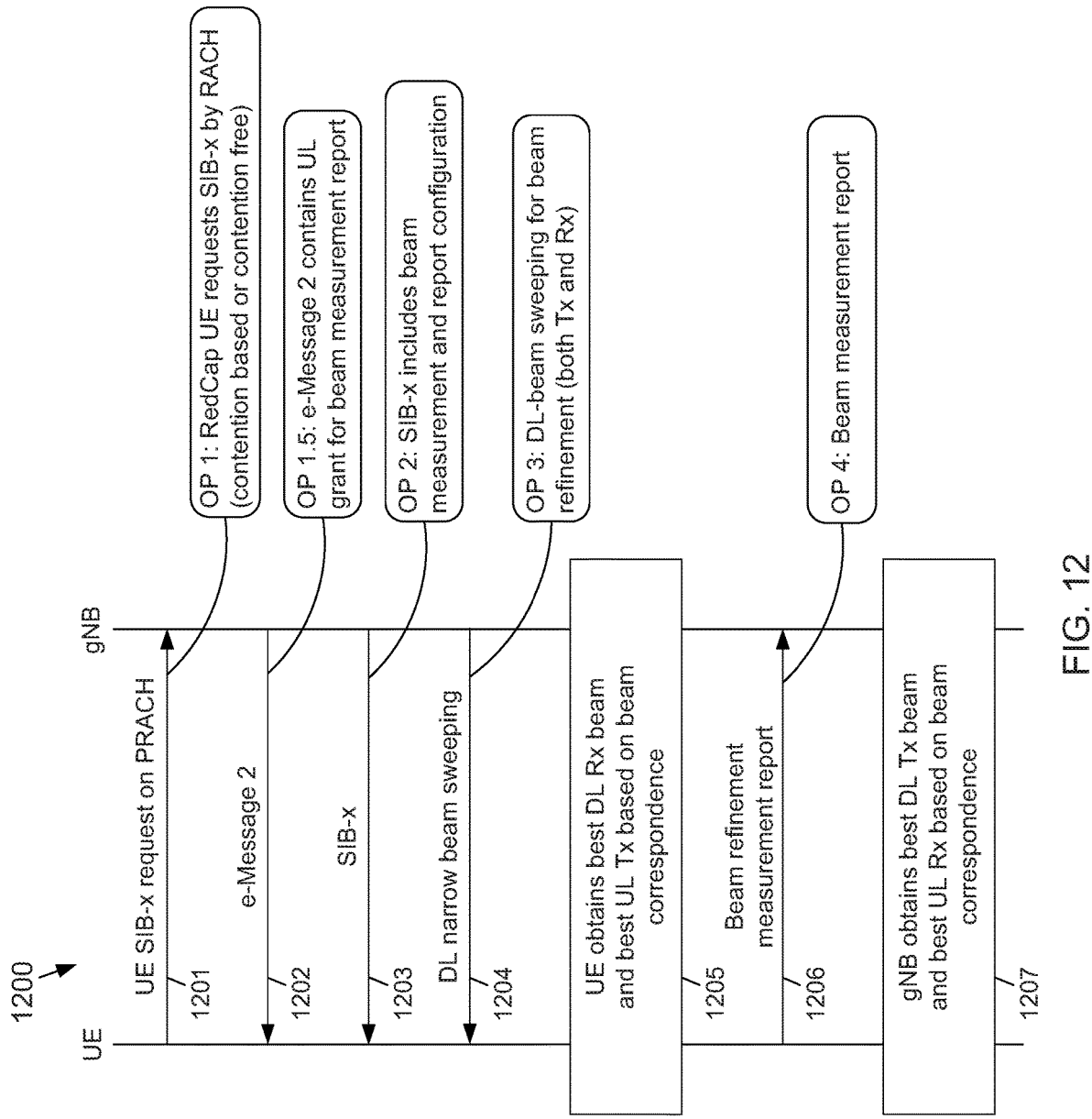
FIG. 12 depicts another example messaging sequence for a beam refinement process for a UE in a RRC_INACTIVE state according to the subject matter disclosed herein.

FIG. 12 depicts another example messaging sequence for a beam refinement process 1200 for a UE in a RRC_INACTIVE state according to the subject matter disclosed herein. Time advances in a downwardly direction. The beam refinement process 1200 may be a contention-based or a contention-free process.

Operational Phase 1 (OP 1). UE Request for SIB-x Information.

Variation 1.1. Contention-Based Process

In a contention-based process, a UE in an inactive state may request an on-demand SIB-x at 1201 by selecting a random access preamble and/or a PRACH occasion. The selected PRACH occasion may correspond to a Synchronization Signal Block (SSB) index having the measured strongest broad beam that was broadcast earlier. The request by the UE may occur periodically or may be event-driven based on, for example, a UL buffer status for UL transmission of the UE, a DL paging of the UE for a DL reception, or a measured RSRP and/or RSRQ of a current DL beam that is less than a threshold (due to beam blockage or intra- or inter-beam interference. Upon successful reception of the request at a gNB, the gNB sends at 1202 an e-Message 2/RAR (extRA ResponseWindow) message to the UE confirming reception of the request at 1201. The e-Message 2 differs from a SIBI message, which is a broadcast message from a gNB to all UEs, by being a message that a gNB sends to a group of UEs that share the same RA-RNTI instead of being a message that is sent to all UEs. In response to the e-Message 2, the UE then sends a request for SIB-x message in an e-Message 3. The e-Message 3 is a PUSCH transmission from a UE to a gNB. In contrast to the e-Message 3, the request sent at 1201 is a transmission of a preamble sequence combined with a PRACH occasion from a UE to a gNB. The gNB acknowledges (ACK) the SIB-x request in a message 4 (not shown). At 1203, the gNB transmits the SIB-x message to UE.

Variation 1.2. Contention-Free Process

In a contention-free process, a UE in an inactive state that has been preconfigured with a PRACH resource to send a SIB-x request sends a SIB-x request at 1201. The PRACH resource may be in a form of random access preamble, a PRACH occasion that may be SIB-x specific, and/or a RedCap UE-specific PRACH resource. The UE requests a new on-demand SIB-x by transmitting the pre-configured PRACH resource to the gNB. The gNB acknowledges (ACK) the request at 1202 in an e-Message 2 and knows that the request for a SIB-x is from the particular UE that sent the request. Triggering conditions for a UE request at 1201 may be the same as for a contention-based process. Sending of a SIB-X request and an acknowledgement are not performed in a contention-free process. At 1203, the gNB transmits the SIB-x message to UE.

Operational Phase 1.5 (OP 1.5)

For both a contention-based and a contention-free process, the resources used for a beam report may be optionally allocated in the e-Message 2. Each RedCap UE that sent a request for SIB-x in a different PRACH resource from other RedCap UEs is allocated a resource that is orthogonal from other allocated resources. In one example embodiment, resource allocation in e-Message 2 may be on-demand, e.g., when a UE sends a request for SIB-x for random access at 1201. Alternatively, resource allocation in an e-Message 2 may be periodically broadcast to UEs independently of a e-Message 1 (which uses a different PRACH resource pool from a normal message 1 (msg1)) and may include a resource grant for a measurement report based on the network remembering a specific earlier-sent request for SIB-x that each UE sent in the past. It may be highly likely that a RedCap UE is stationary, so the set of Redcap UEs per cell may not change and it may be relatively easy for the network to remember the RACH resource that each UE used. Besides resource allocation in an e-Message 2, resources used for a beam report may also be optionally allocated in a normal message 2 for a legacy RACH procedure when UE changes from an in-active state to a connected state. That is, an e-Message 2 differs from a normal message 2 by additionally being able to include allocation of resources for beam refinement and reporting.

Operational Phase 2 (OP 2): Broadcasting SIB-x.

A new SIB-x is broadcast at 1203 within the coverage area of the broad beam indicated by a requested UE (i.e., the SSB index corresponding to strongest broad beam). The gNB does not perform contention resolution for UEs using the same preamble and PRACH occasion because the broadcast SIB is for every contending UE. A SIB-x includes a beam measurement and report configuration. Contents of a SIB-x are described below. The SIB-x is broadcast a predefined number of times (i.e., Aperiodical), or for a predetermined number of times based on the PRACH resource selected by the requesting UE (i.e., Aperiodical). Alternatively, the SIB-x may be broadcast periodically and semi-persistently until a UE explicitly requests to end the broadcast, e.g., when a UE has no data to transmit in the buffer or when a UE has already done a good beam alignment with the gNB in the past in the sense that the measured DL RSRP is greater than a threshold.

Operational Phase 3 (OP 3): Broadcasting DL RS.

Downlink reference signals (DL RSs) for beam refinement may be broadcast on-demand. Upon a gNB receiving a SIB-x request from a UE, the gNB may perform narrow beam sweeping at 1204 by broadcasting a DL SSB or a DL CSI-RS in various narrow beams within the broad beam indicated by the requesting UE. The narrow beam sweeping uses the configuration indicated in the SIB-x. The DL RS may be broadcast periodically continuously (suitable for periodic traffic); for a pre-defined number of times over a time window; for a variable number of times over a time window depending on the PRACH resource selected by the UE requesting the SIB-x; for a variable number of times over a time window depending on the specific SIB-x request in the e-Message 3 in operational phase 1; depending on the accumulated number of UE SIB-x requests within a time window; or broadcast periodically until a UE requests to end the broadcasts.

Operational Phase 4 (OP 4): Measurement Report.

At 1205, a UE performs a UL beam measurement and reports the results to the gNB at 1206 using the measurement configuration indicated in the SIB-x. The resources used for reporting may be allocated in operational phase 2 for UEs that used a different RACH resource for a Message 1 by orthogonal resources being allocated, or by being allocated in a SIB-x in which a set of resources are allocated and contended by all the UEs intending to report a beam measurement. The measurement report may include the C-RNTI of the UEs. At 1207, the gNB obtains the best DL Tx beam and best UL Rx beam based on the report.

Variation 4.1. On-Demand Beam Measurement Report

For an on-demand beam-measurement report, a UE may report the beam measurement based on some events, e.g., when UE has UL data to transmit in the buffer, when the UE is paged by the network because the UE has DL data to receive, when a beam failure is detected by having a measured RSRP and/or RSPQ that is less than a threshold for a predefined number of times, or based on an explicit command from the network via a DL DCI or a RRC message.

Variation 4.2. Periodical Beam Measurement Report

A UE may report a beam measurement periodically when the UE has been periodically configured by the network. In one embodiment, a UE report a beam measurement periodically until the UE enters a RRC_IDLE state.

Figure 13:
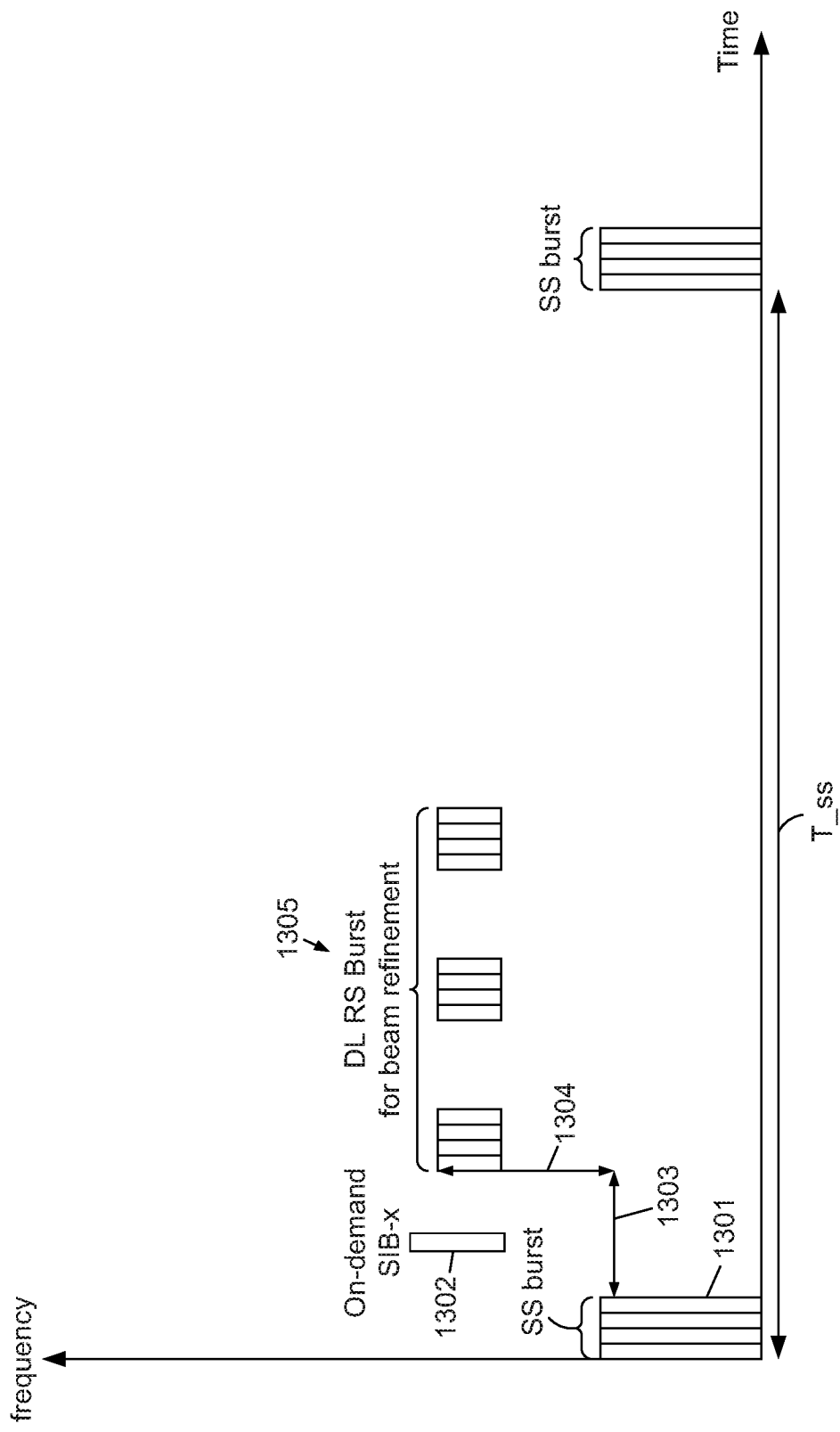
FIG. 13 depicts an example radio resource configuration for beam refinement for a periodical Synchronization Signal Block for broad beam sweeping, a SIB-x and DL RS for narrow beam sweeping according to the subject matter disclosed herein.

FIG. 13 depicts an example radio resource configuration for beam refinement for a periodical Synchronization Signal Block (SSB) for broad beam sweeping, a SIB-x and DL RS (SSB or CSI-RS) for narrow beam sweeping according to the subject matter disclosed herein. In FIG. 13, time increases to the right along the horizontal axis, and frequency increases upwardly along the vertical axis. Subsequent to a SS burst 1301, an on-demand request for a SIB-x 1302 is transmitted by a UE. A predetermined time delay 1303 after completion of the SS burst 1301 and a predetermined frequency difference 1304 from the SS burst 1301, a DL RS burst 1305 are transmitted by a gNB for beam refinement.

Additional Details

As described in connection with operational phase OP 2, a SIB-x may include a beam refinement measurement and report configuration for a RedCap UE in an inactive state. A SIB-x message may alternatively be broadcast after operational phase OP 1 in which the SIB-x message is broadcast only once using the best broad beam towards the RedCap UE. The SIB1 should indicate to the RedCap UE the PDCCH and PDSCH resource for decoding the SIB-x message. This may involve relatively less overhead because the SIB-x may not need to be transmitted if there is no RedCap UE request in operational phase OP 1. Also, less overhead may be involved because beam sweeping is only done within the broad beam instead of 360 degree fully omnidirectional beam.

In one example embodiment, the SIB-x message may be broadcast before operational phase OP 1, similar to a SIB1 broadcast in which the SIB-x may be broadcast multiple times in sequence in each potential direction of the broad beam. The SIB1 may indicate to a RedCap UE the PDCCH and PDSCH resource for decoding the SIB-x message.

A measurement and report configuration in a SIB-x described in operational phase OP 2 may include a specific quantity or set of quantities to be reported; the downlink resource(s) on which measurements should be carried out in order to derive the quantity or quantities to be reported; how the actual reporting is to be carried out, for example, when the reporting is to be performed and what uplink physical channel to use for the reporting.

In one embodiment, a measured quantity may include L1-RSRP. In another embodiment, a measured quantity may include L1-RSRQ, i.e., SS-RSRP and SS-RSRQ.

In one embodiment, a measurement and report configuration in a SIB-x may include a configuration of DL RS for measurement/reporting using CSI-ReportConfig, a measurement resource, report quantity and report type, RS to measure included in NZP-CSI-RS resource set (including SSB or CSI-RS), resource sets may be a configuration for periodic/semi-persistent/aperiodic transmissions, and a set of CSI-RS or SSB that correspond to different DL beams (beam sweep)—based on current beam.

In one embodiment, the downlink resource(s) for measurements may be defined as a set of frequency and time resource element groups in which each group of resource elements corresponds to one SSB or CSI-RS transmission. Typically, one CSI-RS or SSB resource may be defined as one OFDM symbol in time domain and pre-defined number of RBs in frequency domain.

Figure 14:
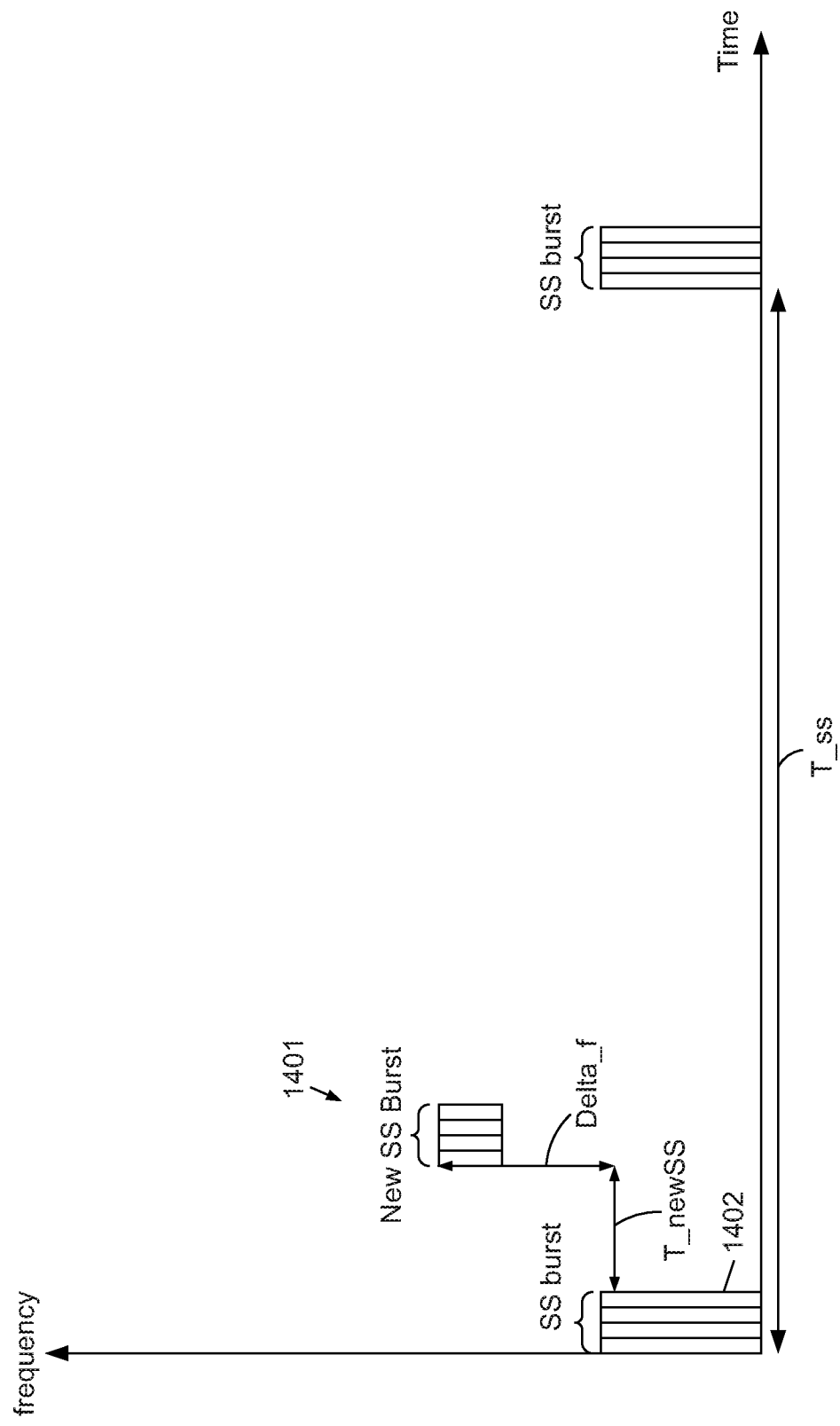
FIG. 14 depicts an example radio resource configuration for beam refinement for a legacy periodical Synchronization Signal Block for broad beam sweeping and a new Synchronization Signal Block for narrow beam sweeping according to the subject matter disclosed herein.

FIG. 14 depicts an example radio resource configuration for beam refinement for a legacy periodical SSB for broad beam sweeping and a new SSB for narrow beam sweeping according to the subject matter disclosed herein. In FIG. 14, time increases to the right along the horizontal axis, and frequency increases upwardly along the vertical axis.

The first SSB/CSI-RS resource may be defined by T_newSS and Delta_f in which T_newSS is a predetermined time delay of the new SS burst 1401 after completion of the SS burst 1402, and Delta_f is a predetermined frequency offset of the new SS burst 1401 from the frequencies of the SS burst 1402. Other SSB/CSI-RS resources may have different pre-defined patterns with respect to the first SSB/CSI-RS resource. The different patterns may be pre-defined and indexed by k. Accordingly, a downlink resource for measurement may be represented by the frequency and time domain location of the first SSB/CSI-RS resource in the time domain and the pattern index k. Other SSB/CSI-RS resources may be computed from the first SSB/CSI-RS resource and the index k. The first SSB/CSI-RS resource may have a fixed relation to the legacy SSB resource, a fixed relation to the CORESET #0 resource, and a fixed relation to the SIB1 resource.

One embodiment of an uplink physical channel to use for reporting beam refinement measurements may be a group of frequency and time resource elements that have been pre-allocated for beam refinement measurement reporting in which the group of resource elements have a fixed relation to the legacy SSB resource, a fixed relation to the CORESET #0 resource, a fixed relation to the SIB1 resource, and a fixed relation to the new SSB resource.

Figure 15:
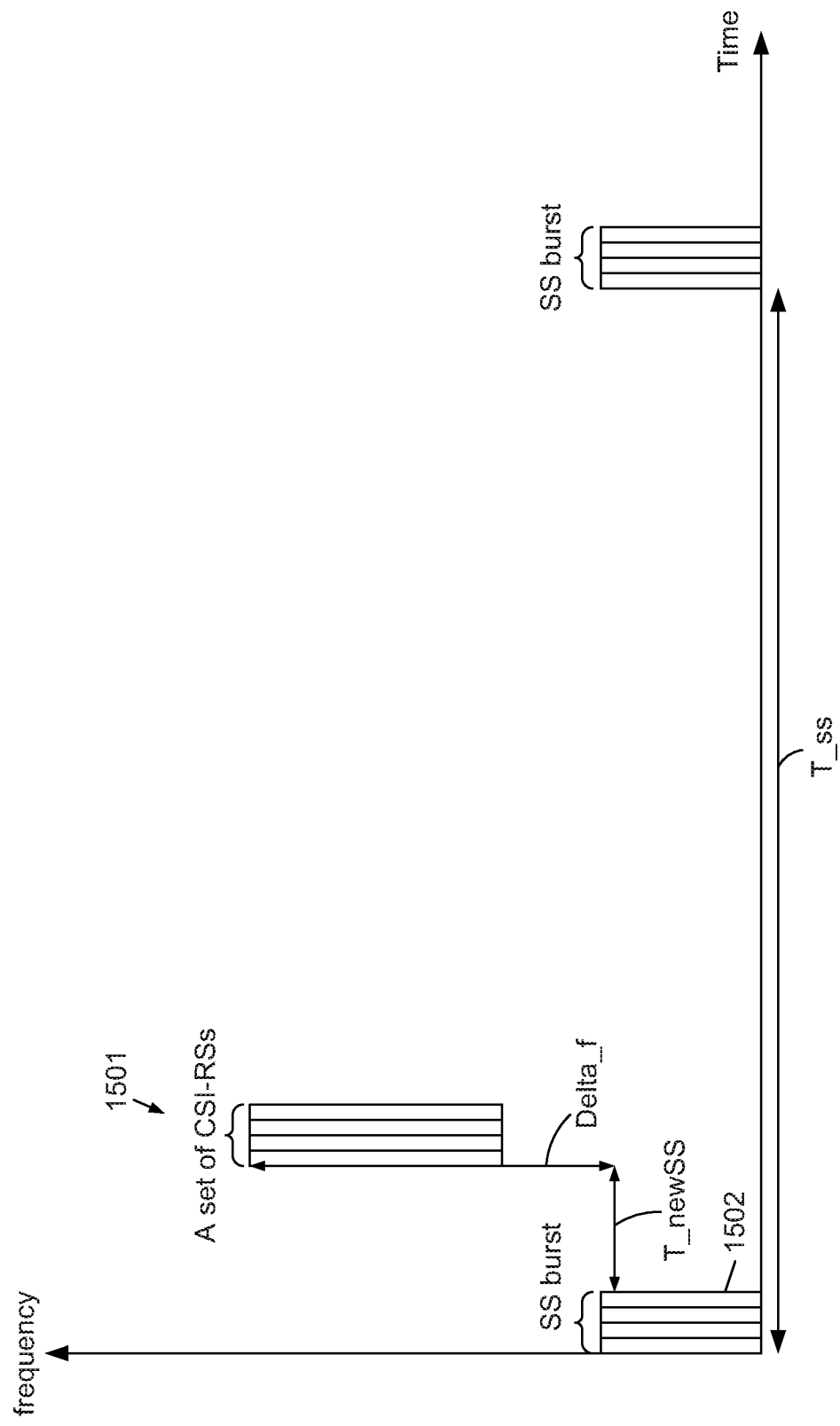
FIG. 15 depicts an example radio resource configuration for beam refinement for a legacy periodical Synchronization Signal Block for broad beam sweeping and CSI-RS for narrow beam sweeping according to the subject matter disclosed herein.

FIG. 15 depicts an example radio resource configuration for beam refinement for a legacy periodical SSB for broad beam sweeping and CSI-RS for narrow beam sweeping according to the subject matter disclosed herein. In FIG. 15, time increases to the right along the horizontal axis, and frequency increases upwardly along the vertical axis.

For CSI-RS-based beam refinement, one example of the resource configurations for legacy SSB for broad beam sweeping and CSI-RS for narrow beam sweeping may be similar to the SSB-based beam refinement as shown in FIG. 14. That is, in FIG. 15 a set of CSI-RSs may be defined by T_newSS and Delta_f in which T_newSS is a predetermined time delay of the set of CSI-RSs 1501 after completion of the SS burst 1502, and Delta_f is a predetermined frequency offset of the CSI-RSs 1501 from the frequencies of the SS burst 1502. The frequency and time domain position CSI-RS resource may be computed by T_newSS and Delta_f using the position of the first CSI-RS resource and the pattern index k.

In operational phase OP 4, while a RedCap UE is in an inactive state and upon receiving a DL new SSB, a RedCap UE sends the beam measurement report to gNB using the allocated reporting resource scrambled by TC-RNTI in PUSCH. The report may include an indication of up to X beams to which the specific report relates; the measured L1-RSRP for the strongest beam; for the remaining up to Y beams, the difference between the measured L1-RSPR and the measured L1-RSRP of the best beam, the parameter reportQuantity in the CSI-ReportConfig that indicates quantity to measure/report L1-RSRP; and measurements for the best N={1, 2, 4} beams (SSB or CSI-RS).

A CSI-RS-based beam measurement report scrambled by TC-RNTI may be sent from the UE to the gNB. The parameter reportQuantity in the CSI-ReportConfig may indicate the quantity to measure and report L1-RSRP. The UE may report measurements for the best N={1, 2, 4} beams (CSI-RS). In one embodiment, the report may include indications of N beams, i.e., N RS to which the report relates; The measured L1-RSRP for the strongest beam; and Diff b/w measured L1-RSRP of n−1 beams and the L1-RSRP of the best beam.

Inactive State Data Transmission Using Legacy Beam Refinement Procedures

In an embodiment for an inactive state data transmission using legacy beam refinement procedures, a UE in an inactive state may sends a specific preamble in a message 1 or a message 3 in a RACH procedure requesting beam refinement to a gNB when the UE is to send data in an inactive state. Upon receiving the request from the UE, the gNB performs beam refinement for the UE after the UE is in a connected state using the legacy beam refinement procedures in NR Rel-15. Once beam refinement is complete, the gNB reconfigures the UE to be an inactive state or the UE autonomously enters into an inactive state after a predetermined period of time without any data transmission. A UE may perform small data transmission in an inactive state using the aligned beam with the gNB.

CSI-RS Vs. SSB Beam Sweep for Beam Refinement

It should be noted that CSI-RS is wider band and, therefore, more accurate, than SSB BWP, but within the Bandwidth Part (BWP) of RedCap UEs. For L1 RSRP measurements, CSI-RS may use two antenna ports, which may lead to more reliable beam measurements.

A Message 2 may be a relatively large message that may include a set of UL grants in which each grant is for individual UEs using the same RO. UEs using the same Rach Occasion (RO) in a Message 2 may share the same RA-RNTI. A reason for using RA-RNTI scrambling may be to reduce the size of a Message 2 so that the Message 2 may only include the sub MAC PDU from UEs in the same RO, instead of all the UEs in the cell.

It should also be noted that the SSB should be without RA-RNTI scrambling because there is no need for scrambling the RS.

A UE Report Using Allocated Resources Including the Index of SSB and Strongest RSRP Value A CSI report may be scrambled by TC-RNTI in PUSCH and PUCCH as the message 3 so that UEs having a different TC-RANTI may reuse the same resource. UEs with the same TC-RNTI may collide in the gNB in which case it is the implementation of the gNB to resolve the collisions as in a message 3.

For a two-step RACH, the new SSB pattern with medium beam granularity may be introduced to fine tune the beam before message A without waiting for detecting the broader beam in legacy SSB.

In FR2, a SSB repetition in time may be needed to compensate path loss with only one Rx antenna.

In FR2, new SSB patterns with repetition may be extended for keeping the same BW as a legacy pattern, but is located at a different frequency position than legacy pattern with a time offset to the legacy pattern. The new SSB pattern is in another location in the synchronizations raster in FR2, whereas a legacy SSB pattern is in one location of synchronizations raster in FR2. (The legacy UE decode the legacy one, the NR light UE decodes the new SSB pattern.)

A base station should broadcast two SSB patterns in FR2 with one for NR light UEs with time domain repetition. In FR2, legacy UEs decode legacy patterns, and the NR light UE decode the new SSB patterns.

It may be assumed that a UE knows beforehand whether it is in FR1 or FR2 by blind decoding the synchronizations raster.

Figure 16:
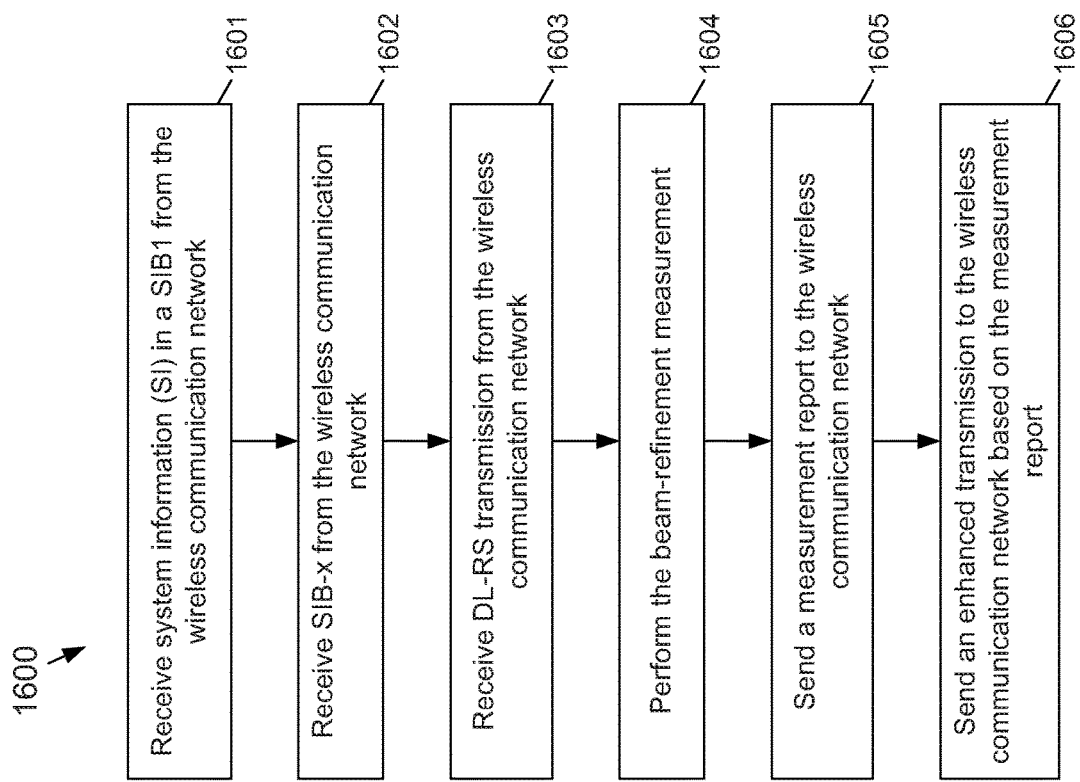
FIG. 16 is a flowchart of an example method to perform a beam-refinement measurement in a wireless communication network according to the subject matter disclosed herein.

FIG. 16 is a flowchart of an example method 1600 to perform a beam-refinement measurement in a wireless communication network according to the subject matter disclosed herein. At 1601, a device, such as a RedCap UE and/or a UE like the UE 116 depicted in FIG. 3 in an inactive state, receives system information in a SIB1 from the wireless communication network. In one embodiment, the wireless communication network may be a wireless communication network like the wireless communication network 100 depicted in FIG. 1, which includes a base station, like the base station 102 depicted in FIG. 2. The SIB1 may include information relating to an indication of resources used to transmit a SIB-x by the wireless communication network. In one embodiment, a SIB-x may be transmitted by the wireless communication network periodically or semi-periodically. In another embodiment, a SIB-x may be transmitted in response to an on-demand request from the device for a SIB-x.

At 1602, the device receives the SIB-x from the wireless communication network. The SIB-x may including an indication of at least one resource, at least one configuration for a Downlink-Reference Signal (DL-RS) transmission by the wireless communication network, and information relating to a measurement report relating to the beam-refinement measurement that is to be performed by the device. In one embodiment, the DL-RS may be transmitted by the wireless network periodically or semi-periodically. In another embodiment, a DL-RS may be transmitted in response to an on-demand request from the device for a DL-RS.

At 1603, the device receives the DL-RS transmission from the wireless communication network. At 1604, the device performs the beam-refinement measurement. At 1605, the device sends a measurement report to the wireless communication network. At 1606, the device sends an enhanced transmission to the wireless communication network based on the measurement report.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may include many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A device, comprising:
   a transceiver coupled to a wireless communication network; and
   a processing device coupled to the transceiver, while the device is in an inactive state, the processing device being configured to control the transceiver to:
      receive system information in a System Information Block 1 (SIB1) from the wireless communication network, the SIB1 including information relating to an indication of resources used to transmit a SIB-x by the wireless communication network,
      receive the SIB-x from the wireless communication network, the SIB-x including an indication of at least one resource, at least one configuration for a Downlink-Reference Signal (DL-RS) transmission by the wireless communication network, and information relating to a measurement report relating to a beam-refinement measurement that is to be performed by the device, and
      receive the DL-RS transmission from the wireless communication network.

2. The device of claim 1, wherein the SIB-x is periodically sent by the wireless communication network.

3. The device of claim 1, wherein while the device is in the inactive state, the processing device is further configured to control the transceiver to:
   send an on-demand SIB-X request to the wireless communication network, and
   receive the SIB-x sent by the wireless communication network in response to the on-demand SIB-x request.

4. The device of claim 1, wherein the DL-RS transmission is periodically sent by the wireless communication network.

5. The device of claim 1, wherein the DL-RS transmission is sent by the wireless communication network in response to an on-demand DL-RS request sent by the device to the wireless communication network.

6. The device of claim 1, wherein while the device is in the inactive state, the processing device is further configured to control the transceiver to:
perform the beam-refinement measurement, and
send the measurement report to the wireless communication network.

7. The device of claim 6, wherein while the device is in the inactive state, the processing device is further configured to control the transceiver to send an enhanced transmission to the wireless communication network based on the measurement report.

8. The device of claim 1, wherein the device comprises a reduced-capability (RedCap) user equipment, and the wireless communication network comprises a Fifth Generation (5G) wireless communication network.

9. A base station in a wireless communication network, the base station comprising:
a first transceiver; and
a first processing device coupled to the first transceiver, the first processing device being configured to:
send system information in a System Information Block 1 (SIB1) to a device wirelessly coupled to the wireless communication network, the SIB1 including information relating to an indication of resources used to transmit a SIB-x by the wireless communication network, the device being in an inactive state,
send the SIB-x to the device, the SIB-x including an indication of at least one resource, at least one configuration for a Downlink-Reference Signal (DL-RS) transmission by the wireless communication network, and information relating to a measurement report relating to a beam-refinement measurement that is to be performed by the device, and
send the DL-RS transmission to the device.

10. The base station of claim 9, wherein the SIB-x is periodically sent by the base station.

11. The base station of claim 9, wherein the first processing device further controls the first transceiver to send the SIB-x to the device in response to an on-demand SIB-x request received from the device.

12. The base station of claim 9, wherein the DL-RS transmission is periodically sent by the base station.

13. The base station of claim 9, wherein the first processing device further controls the first transceiver to send the DL-RS transmission to the device in response to an on-demand DL-RS request received from the device.

14. The base station of claim 9, further comprising the device, the device comprising:
a second transceiver coupled to the wireless communication network; and
a second processing device coupled to the second transceiver, the second processing device being configured to:
receive the system information in the SIB1,
receive the SIB-x,
receive the DL-RS transmission,
perform the beam-refinement measurement, and
send the measurement report to the wireless communication network.

15. The base station of claim 9, wherein the first processing device further controls the first transceiver to receive a measurement report from the device.

16. The base station of claim 15, wherein the first processing device further controls the first transceiver to receive an enhanced transmission from the device based on the measurement report.

17. The base station of claim 9, wherein the device comprises a reduced-capability (RedCap) user equipment, and the wireless communication network comprises a Fifth Generation (5G) wireless communication network.

18. A method to perform a beam-refinement measurement in a wireless communication network, the method comprising:
receiving, by a device, system information in a System Information Block 1 (SIB1) from the wireless communication network, the SIB1 including information relating to an indication of resources used to transmit a SIB-x by the wireless communication network, the device being in an inactive state;
receiving, by the device, the SIB-x from the wireless communication network, the SIB-x including an indication of at least one resource, at least one configuration for a Downlink-Reference Signal (DL-RS) transmission by the wireless communication network, and information relating to a measurement report relating to the beam-refinement measurement that is to be performed by the device; and
receiving, by the device, the DL-RS transmission from the wireless communication network.

19. The method of claim 18, wherein the SIB-x is periodically sent by the wireless communication network.

20. The method of claim 18, wherein the SIB-x is sent by the wireless communication network in response to an on-demand SIB-x request sent by the device to the wireless communication network.

21. The method of claim 18, wherein the DL-RS transmission is periodically sent by the wireless communication network.

22. The method of claim 18, wherein the DL-RS transmission is sent by the wireless communication network in response to an on-demand DL-RS request sent by the device to the wireless communication network.

23. The method of claim 18, further comprising:
performing, by the device, the beam-refinement measurement; and
sending, by the device to the wireless communication network, the measurement report.

24. The method of claim 23, further comprising sending by the device an enhanced transmission to the wireless communication network based on the measurement report.

25. The method of claim 18, wherein the device comprises a reduced-capability (RedCap) user equipment, and the wireless communication network comprises a Fifth Generation (5G) wireless communication network.

* * * * *